(12) United States Patent
Fujino et al.

(10) Patent No.: US 11,420,354 B2
(45) Date of Patent: Aug. 23, 2022

(54) FILM CUTTING JIG AND METHOD OF MOUNTING FILM

(71) Applicant: 3M INNOVATIVE PROPERTIES COMPANY, St. Paul, MN (US)

(72) Inventors: Takayoshi Fujino, Sagamihara (JP); Masayuki Kubota, Hadano (JP)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 19 days.

(21) Appl. No.: 16/340,740

(22) PCT Filed: Oct. 11, 2017

(86) PCT No.: PCT/US2017/056010
§ 371 (c)(1),
(2) Date: Apr. 10, 2019

(87) PCT Pub. No.: WO2018/075298
PCT Pub. Date: Apr. 26, 2018

(65) Prior Publication Data
US 2019/0337176 A1    Nov. 7, 2019

(30) Foreign Application Priority Data

Oct. 20, 2016    (JP) .............................. JP2016-205923

(51) Int. Cl.
*B26B 29/06* (2006.01)
*B62D 65/16* (2006.01)
*B26B 1/08* (2006.01)

(52) U.S. Cl.
CPC .............. *B26B 29/06* (2013.01); *B62D 65/16* (2013.01); *B26B 1/08* (2013.01)

(58) Field of Classification Search
CPC ........... B26B 29/06; B26B 1/08; B62D 65/16; B32B 38/0004; B29C 63/0004
See application file for complete search history.

(56) References Cited

U.S. PATENT DOCUMENTS

| 4,452,483 | A | * | 6/1984 | Kano | ...................... | B60R 13/07 296/213 |
| 4,995,538 | A | * | 2/1991 | Marengo | ................. | B60R 9/045 224/315 |

(Continued)

FOREIGN PATENT DOCUMENTS

| DE | 299 03 745 | 9/1999 |
| JP | H6-026766 U | 4/1994 |

(Continued)

OTHER PUBLICATIONS

Leclaire, "Installing Vehicle Wraps Like the Pros (Final part of a three-part series)", SignIndustry.com, Internet Archive Capture dated Mar. 18, 2015 (https://web.archive.org/web/20150318005225/http://www.signindustry.com/vinyl/articles/2003-02-14-JL-VinylWrapPt3.php3) (Year: 2015).*

(Continued)

*Primary Examiner* — Michael N Orlando
*Assistant Examiner* — Christopher W Raimund
(74) *Attorney, Agent, or Firm* — Vincent Pham

(57) ABSTRACT

Object: To provide a film cutting jig and a method of mounting a film that can easily mount a film that not only covers a roof of an object but also wraps around to the sidewalls of the object. Resolution means: The present invention provides a film cutting jig used when cutting a film to cover at least a roof of an object that includes a sidewall and the roof, the film cutting jig including: a main jig body that is to be attached to the object to continuously surround a covered region that includes the roof and at least a portion of a top edge side of the sidewall when the object is viewed from above, wherein a guide for guiding a cutting tool to cut the film is formed in the main jig body, and wherein the guide is formed to continuously surround the covered region when the object is viewed from above.

16 Claims, 18 Drawing Sheets

(56) References Cited

U.S. PATENT DOCUMENTS

| | | | | | |
|---|---|---|---|---|---|
| 5,079,842 | A | * | 1/1992 | Ward | A47G 27/0487 |
| | | | | | 30/289 |
| 6,001,198 | A | * | 12/1999 | Habisreitinger | B65B 41/14 |
| | | | | | 156/64 |
| 2006/0123966 | A1 | * | 6/2006 | Oh | B26D 3/10 |
| | | | | | 83/565 |
| 2007/0137449 | A1 | * | 6/2007 | Whaley | D05B 97/12 |
| | | | | | 83/13 |
| 2009/0019707 | A1 | * | 1/2009 | Samuels | B26B 15/00 |
| | | | | | 30/289 |

FOREIGN PATENT DOCUMENTS

| | | |
|---|---|---|
| JP | H7-037049 U | 7/1995 |
| WO | WO 2015/127350 | 8/2015 |

OTHER PUBLICATIONS

International Search Report for PCT International Application No. PCT/US2017/056010, dated Jan. 19, 2018, 4 pages.

* cited by examiner

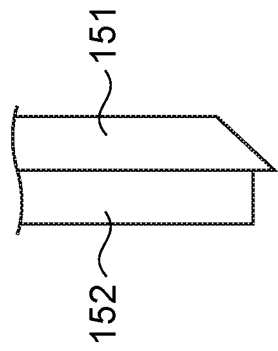
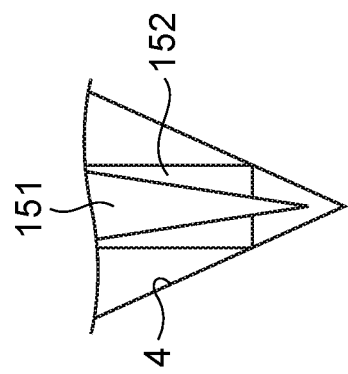
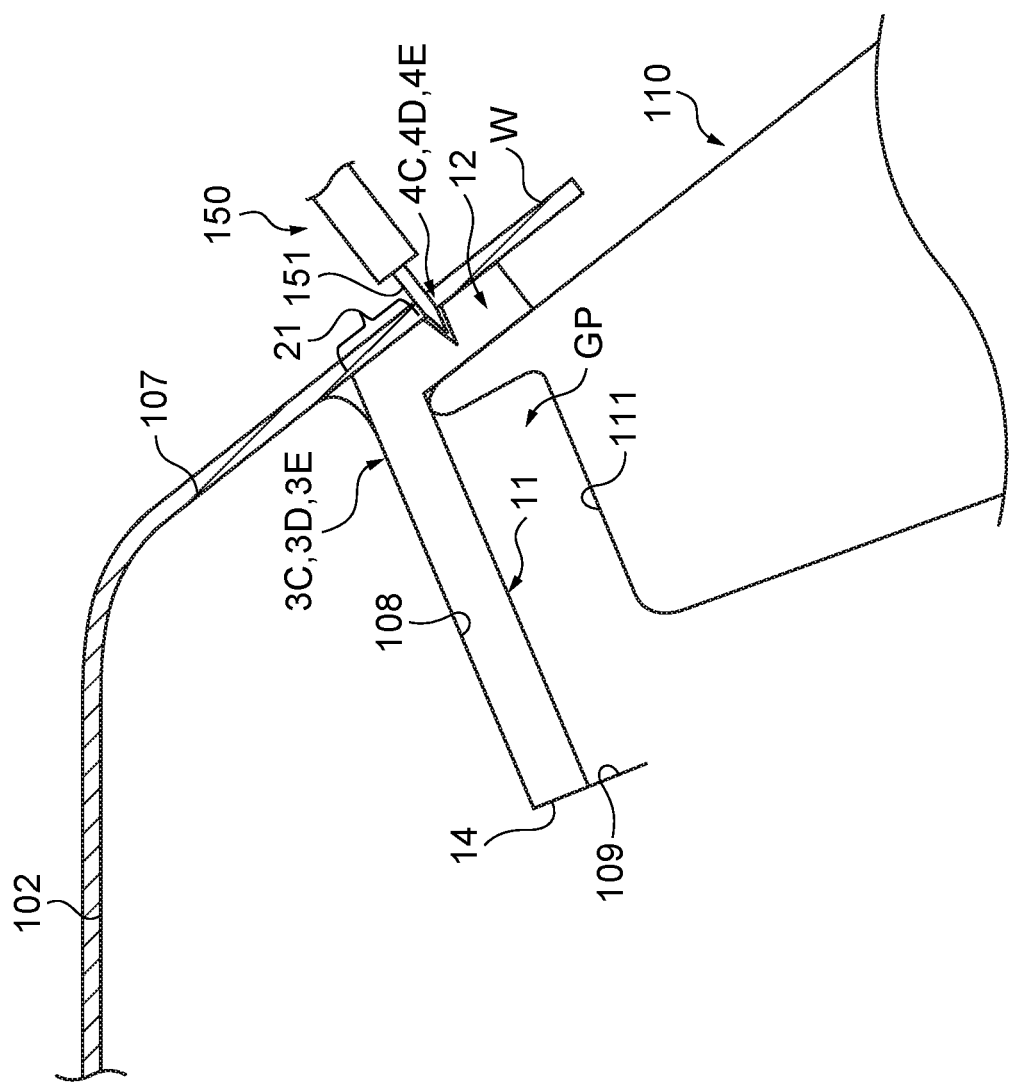

FILM CUTTING JIG AND METHOD OF MOUNTING FILM

CROSS REFERENCE TO RELATED APPLICATIONS

This application is a national stage filing under 35 U.S.C. 371 of PCT/US2017/056010, filed Oct. 11, 2017 which claims the benefit of Japanese Application No. 2016-205923, filed Oct. 20, 2016, the disclosures of which are incorporated by reference in their entirety herein.

TECHNICAL FIELD

The present invention relates to a film cutting jig and a method of mounting a film.

BACKGROUND ART

In recent years, the bodies of vehicles are sometimes painted with several paint colors, and in some cases at least one of these several paints is applied by applying an adhesive-backed paint replacement film to the vehicle body. Patent Document 1 discloses an example of one such technology. In Patent Document 1, an adhesive-backed paint replacement film is cut to match the shape of a portion of a front of the vehicle body, and then this film is applied to the vehicle body.

CITATION LIST

Patent Literature

Patent Document 1: International Application Published under the PCT Publication No. WO 2015/127350

SUMMARY OF INVENTION

Technical Problem

The film application technology described above is sometimes used to apply an adhesive-backed paint replacement film to the roof of a vehicle (e.g., a passenger automobile). It can be easy to mount the film, if the film is only mounted to the roof. However, if the film needs to not only cover the roof but also wrap around to the sidewalls of the vehicle, it can be significantly more difficult to mount the film. Therefore, there is a need for a technology that can easily mount an adhesive-backed film that not only covers the roof but also wraps around to the sidewalls of the vehicle.

Solution to Problem

According to one embodiment of the present invention, a film cutting jig configured (i.e., dimensioned and designed) for cutting a film to cover at least a roof of an object that includes a sidewall and the roof includes: a main jig body that is to be attached to the object to continuously surround a covered region that includes the roof and at least a portion of a top edge side of the sidewall when the object is viewed from above, wherein a guide for guiding a cutting tool to cut the film is formed in the main jig body, and wherein the guide is formed to continuously surround the covered region when the object is viewed from above.

According to this embodiment, the film cutting jig includes the main jig body that is to be attached to the object to continuously surround the covered region including the roof and at least the portion of the top edge side of the sidewall. Moreover, the guide for guiding the cutting tool to cut the film is formed in the main jig body, and the guide is formed to continuously surround the covered region when the object is viewed from above. As a result, during operation, attaching the main jig body to the object and then cutting the film along the guide formed in the main jig body can easily cut the film into a shape that corresponds to the covered region. In this way, the film that not only covers the roof but also wraps around to the sidewall can be easily mounted.

In the film cutting jig according to another embodiment, the sidewall of the object may include a door, an edge of the door and a region on the top edge side of the sidewall may be arranged with a gap, the main jig body may include: an anchoring portion that is inserted into the gap and is anchorable to one of the roof, the sidewall, and the door; and an exposed portion formed in an edge face of the anchoring portion and exposed from the gap, and the guide may be formed in the exposed portion.

In the film cutting jig according to another embodiment, the sidewall may include a pillar formed on at least one side of the door in a horizontal direction thereof.

In the film cutting jig according to another embodiment, a top edge and the guide of the exposed portion may be separated from one another.

In the film cutting jig according to another embodiment, the exposed portion may include, in a region thereof between a sidewall side top edge and the guide, a peeling facilitation section, from the peeling facilitation section, an adhesive on a rear surface side of the film being more easily peelable than from the sidewall.

In the film cutting jig according to another embodiment, at least one of the roof and the sidewall may include an opposite face that faces a top edge face of the door inside the gap and is curved in an upward-bulging manner, the anchoring portion may be curved along the opposite face of the sidewall and may include a first anchoring region provided with a plurality of first magnets being arranged side by side along a surface direction of the opposite face and a second anchoring region provided with a plurality of second magnets being arranged side by side along the surface direction of the opposite face, an axis of one magnet of the plurality of first magnets may be designated as a first main axis and be orthogonal to the opposite face, and axes of other magnets of the plurality of first magnets may be arranged parallel to the first main axis, and an axis of one magnet of the plurality of second magnets may be designated as a second main axis and be orthogonal to the opposite face, and axes of other magnets of the plurality of second magnets may be arranged parallel to the second main axis.

In the film cutting jig according to another embodiment, a receiving face that receives the door may be formed, at a back side of the gap, in at least one of the roof and the sidewall, a positioning member that contacts the receiving face and thereby positions the main jig body may be formed in the back side of the anchoring portion, and a spacing portion that is separated from the receiving face may be formed in the positioning member.

In the film cutting jig according to another embodiment, the main jig body may be divided into a plurality of sections along a peripheral direction of the covered region.

In the film cutting jig according to another embodiment, at a corner of the guide at an intersection between a first cutting direction and a second cutting direction, an extension may be formed to extend past the corner towards an edge side of the main jig body along the first cutting direction and the second cutting direction.

The film cutting jig according to another embodiment may further include: a cover that is to be attached to the sidewall to cover, from above, the film that is applied to the sidewall, wherein the guide of the cover includes a through portion that extends along a cutting direction and penetrates through the cover as well as a groove that is recessed inwards from an outer surface at side edges of the through portion and extends along the through portion.

In the film cutting jig according to another embodiment, a bottom side of the cover relative to the through portion may be attachable to the sidewall, and an upper side of the cover relative to the through portion may be separated from the sidewall.

According to one embodiment of the present invention, a method of mounting a film to cover at least a roof of an object that includes a sidewall and the roof includes: attaching to the object a film cutting jig to continuously surround a covered region including the roof and at least a portion of a top edge side of the sidewall when the object is viewed from above, and cutting the film by guiding a cutting tool continuously, when the object is viewed from above, to surround the covered region along a guide formed in the film cutting jig.

According to this embodiment, the same functions and effects as the film cutting jig described above can be achieved.

In another embodiment of the method of mounting the film, the cutting tool used in cutting the film may include a cutting edge and a rod-shaped member that extends towards a tip side of the cutting edge.

Advantageous Effects of Invention

The present invention can easily mount a film that not only covers the roof but also wraps around to the sidewalls of a vehicle.

BRIEF DESCRIPTION OF DRAWINGS

FIGS. 11A to 11C are a schematic diagrams for explaining the method of mounting the film.

DESCRIPTION OF EMBODIMENTS

Figure 1:
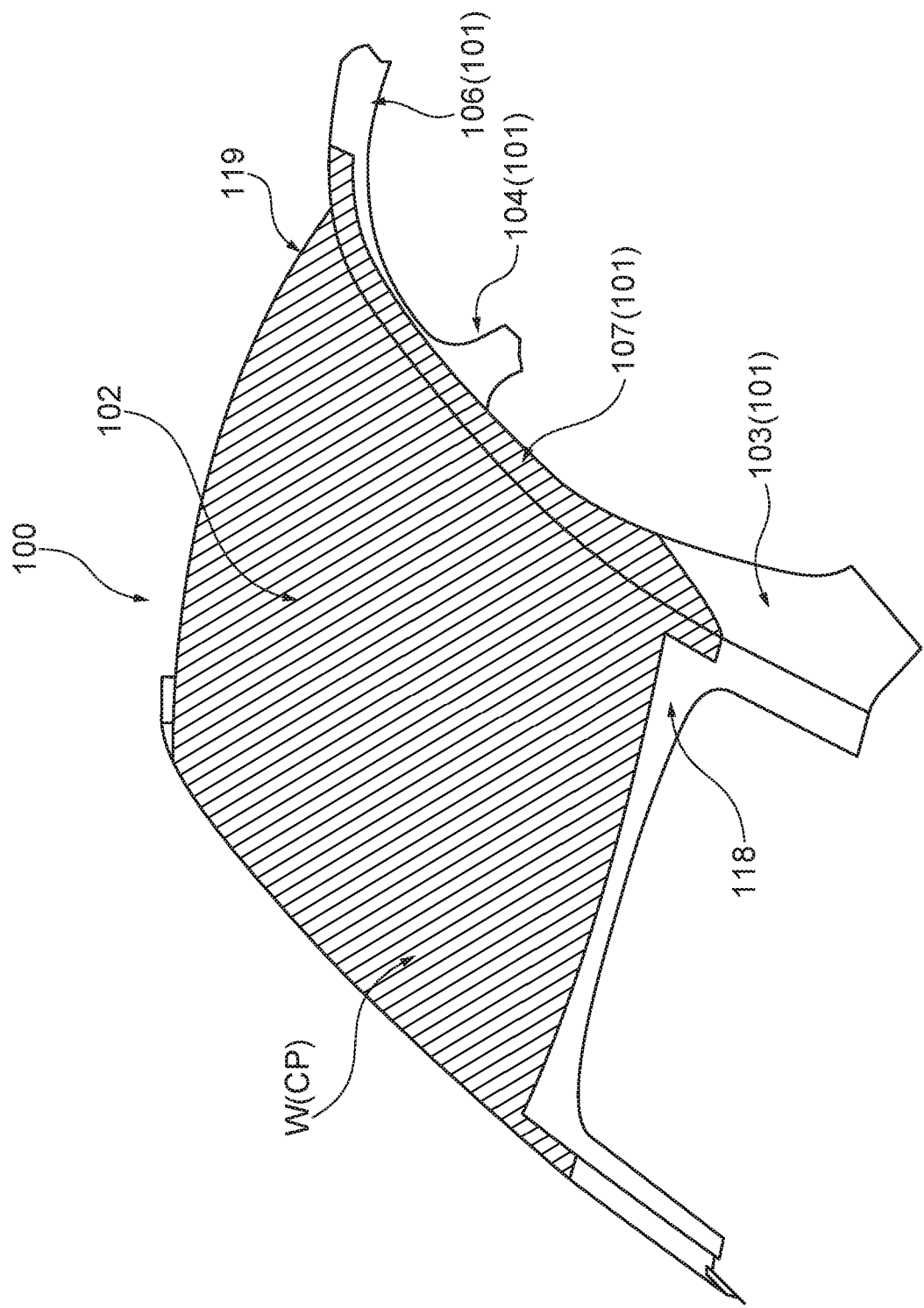
FIG. 1 is a perspective view illustrating a vehicle to which a film has been mounted using a film cutting jig according to an embodiment of the present invention.

Next, an embodiment of the present invention will be described in detail with reference to the attached drawings. Note that in the following description, the same reference characters are used for components that are the same as or equivalent to one another, and redundant descriptions of these components will be omitted.

FIG. 1 is a perspective view illustrating a vehicle to which a film has been mounted using a film cutting jig according to an embodiment of the present invention. As illustrated in FIG. 1, a vehicle 100 which is the object to which the film is to be mounted includes sidewalls 101 and a roof 102. A film W covers a covered region CP that includes the roof 102 of the vehicle 100 and at least a portion of the top edge sides of the sidewalls 101. In FIG. 1, the portion of the vehicle 100 that is covered by the film W is indicated by the hatching. The vehicle 100 includes the roof 102, rear pillars 103 that extend rearward from the roof 102, center pillars 104 that extend downward from the center of the roof 102 in the front-back direction, front pillars 106 that extend forward from the roof 102, a frame 118 for attaching a rear window in a region surrounded by the roof 102 and the rear pillars 103, and a frame 119 for attaching a windshield in a region surrounded by the roof 102 and the front pillars 106. Together, the rear pillars 103, the center pillars 104, and the front pillars 106 form the sidewalls 101. The sidewalls 101 also include upper edges 107 that curve downwards from the side edges of the roof 102 and doors 110 (see FIG. 8). The upper edges 107 are formed between the roof 102 and the top edges of the doors. Moreover, the doors include front doors and rear doors. In the horizontal direction, the rear pillars 103 are formed along the rear sides of the rear doors, the front pillars 106 are formed along the front sides of the front doors, and the center pillars 104 are formed between the rear doors and the front doors. In the present embodiment, the film W is applied to a portion of the top edge sides of the rear pillars 103 and the front pillars 106 and to the upper edges 107 of the sidewalls 101. However, the film W may be applied to at least one of the rear pillars 103 and the front pillars 106, and the film W may also be applied to the center pillars 104.

Figure 2:
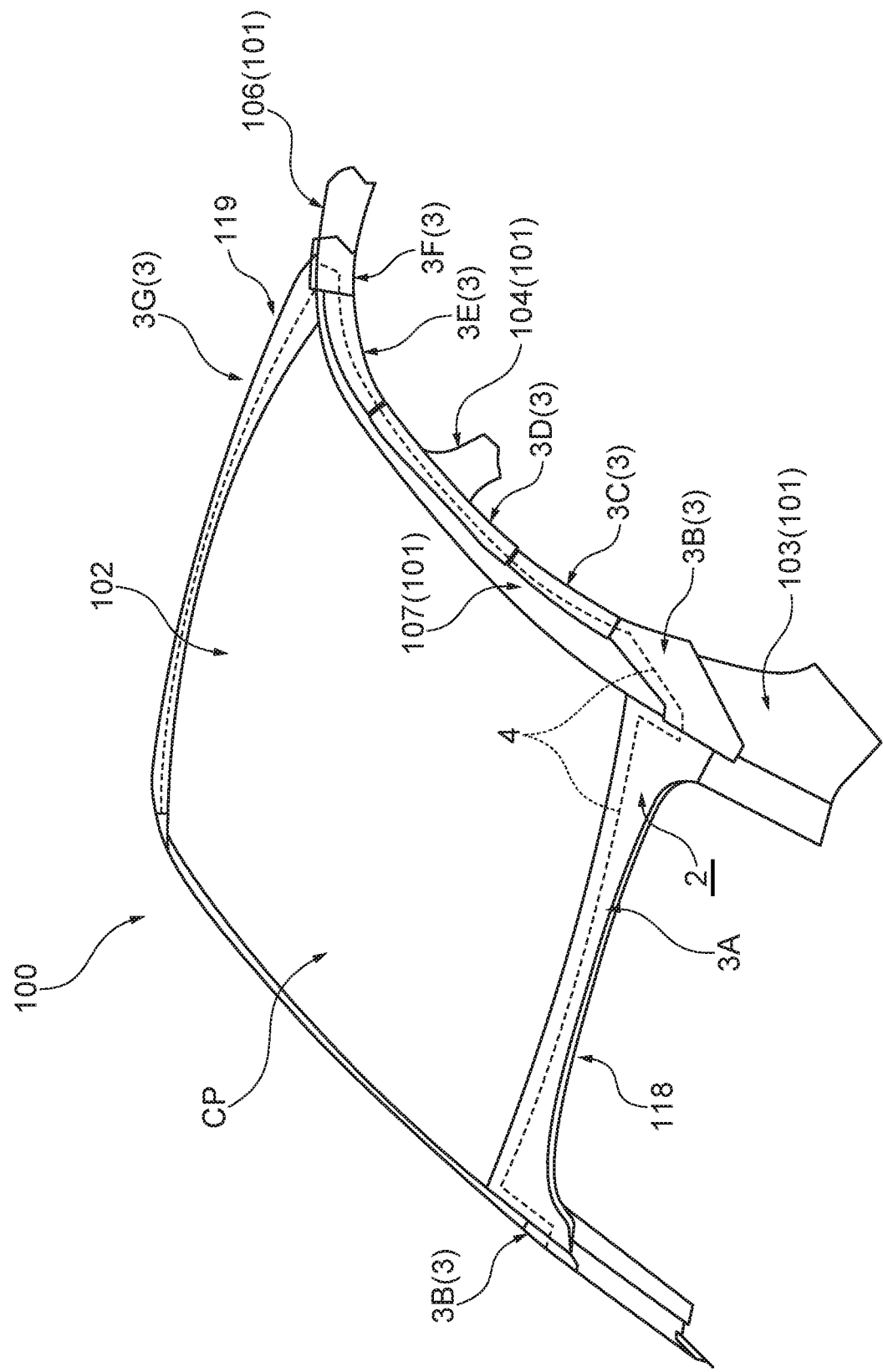
FIG. 2 is a perspective view illustrating how the film cutting jig according to the embodiment is attached to the vehicle.
Figure 3:
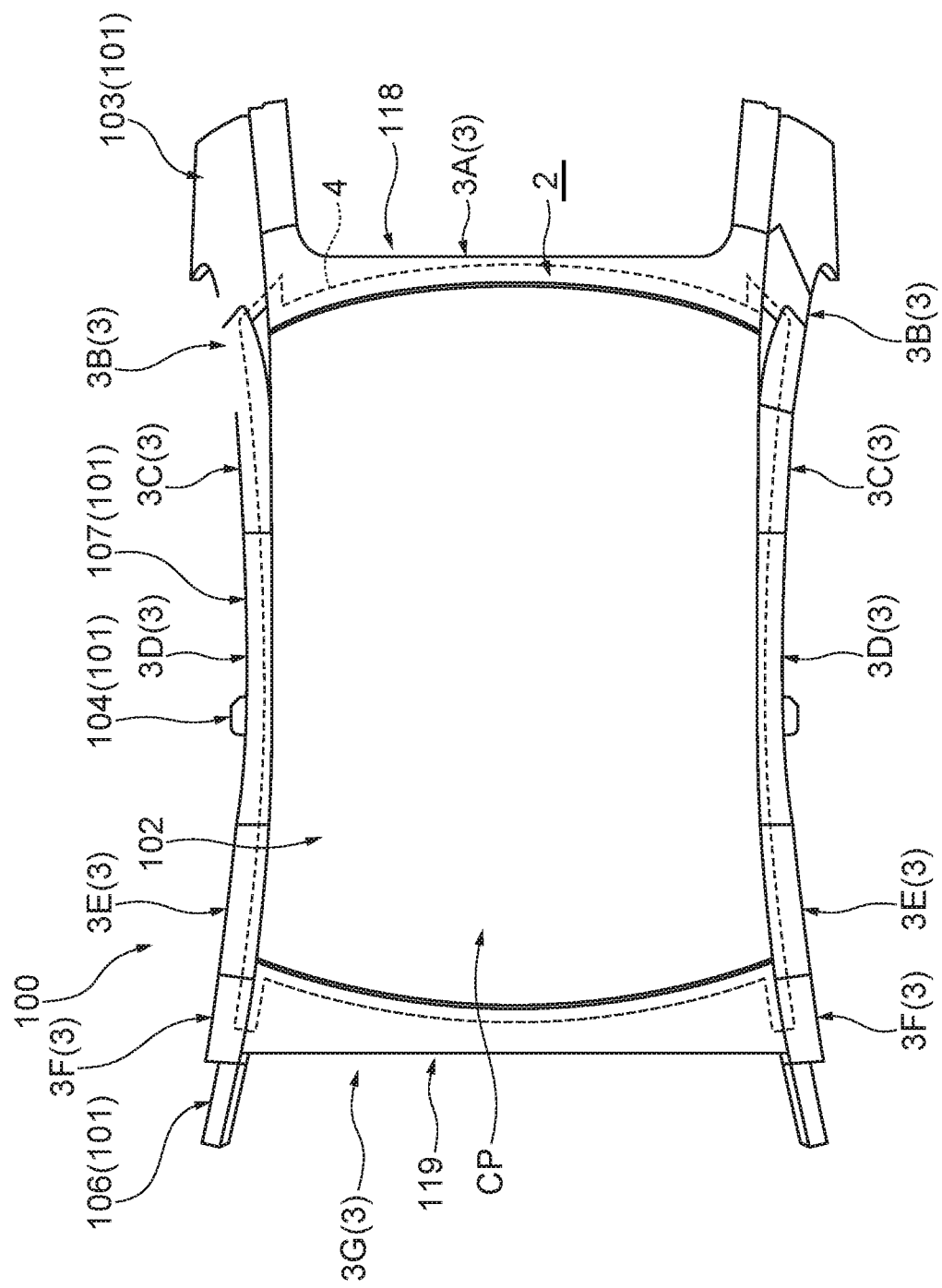
FIG. 3 is a plan view illustrating how the film cutting jig according to the embodiment is attached to the vehicle.

FIG. 2 is a perspective view illustrating how the film cutting jig according to the present embodiment is attached to the vehicle. FIG. 3 is a plan view illustrating how the film cutting jig according to the present embodiment is attached to the vehicle. A film cutting jig 2 is used to cut a film W that is applied to the roof 102 and the sidewalls 101 of the vehicle 100 to a desired shape.

As illustrated in FIGS. 2 and 3, the film cutting jig 2 includes a main jig body 3 that is to be attached to the vehicle 100 and continuously surrounds the covered region CP including the roof 102 and the top edge sides of the sidewalls 101 when the vehicle 100 is viewed from above.

Moreover, a guide 4 for guiding a cutting tool (e.g., a cutting blade) to cut the film W is formed in the main jig body 3. The guide 4 can be in the form of a channel or other structure for receiving the cutting tool and continuously surround the covered region CP when the vehicle 100 is viewed from above. In FIGS. 2 and 3, the position of the guide 4 is indicated by the dashed line. As illustrated in FIGS. 2 and 3, the guide 4 surrounds the entire periphery of the covered region CP.

The main jig body 3 of the film cutting jig 2 is divided into a plurality of sections along the peripheral direction of the covered region CP. More specifically, the film cutting jig 2 includes a main jig body 3A to be attached to the rear side frame 118: main jig bodies 3B to be attached to the rear pillars 103: main jig bodies 3C, 3D, and 3E to be attached to the upper edges 107; main jig bodies 3F to be attached to the front pillars 106; and a main jig body 3G attached to the front side frame 119. However, the number of divisions and the locations of the divisions are not particularly limited and may be changed as needed.

Figure 4:
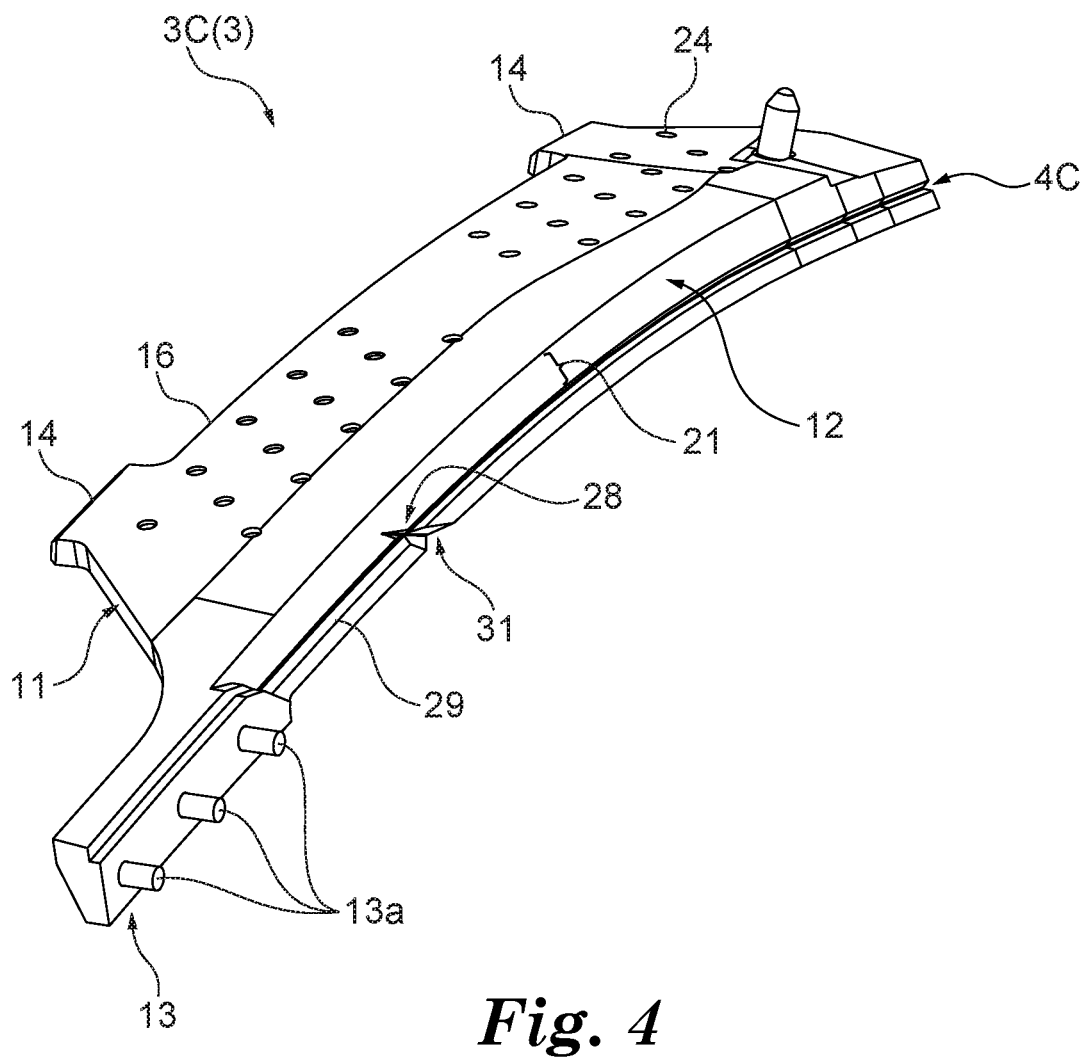
FIG. 4 is a perspective view of a main jig body.
Figure 5:
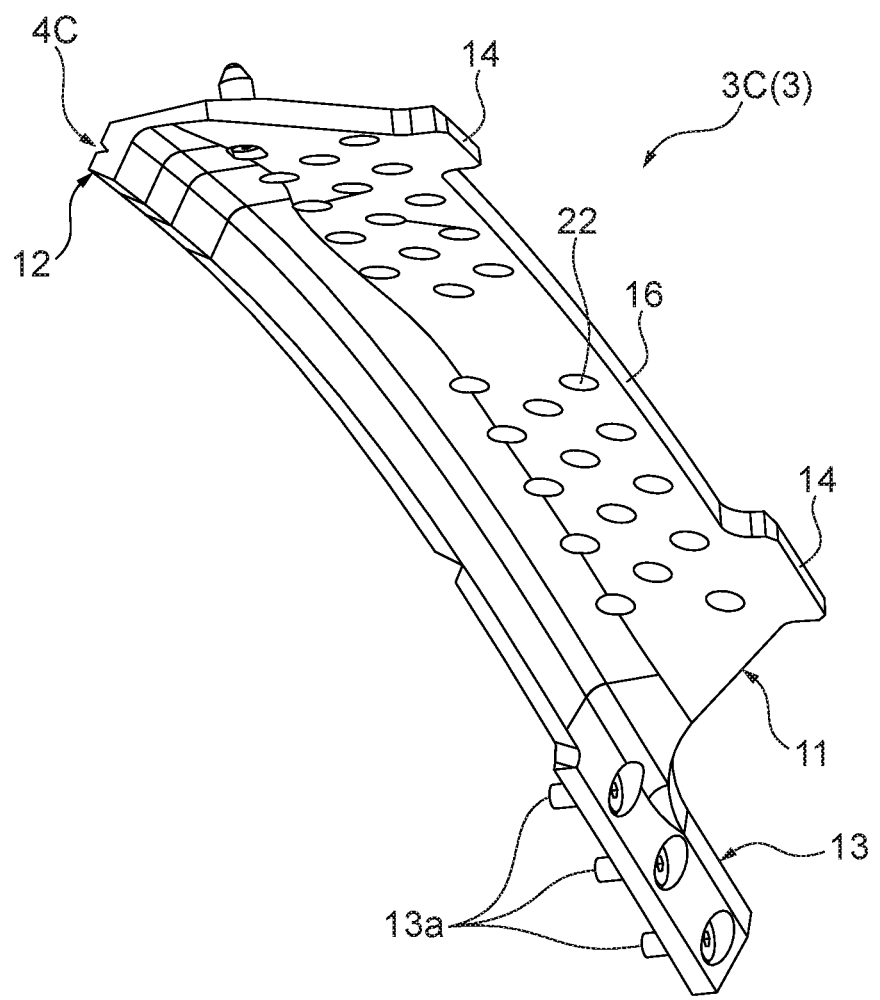
FIG. 5 is a perspective view of the main jig body as viewed from a different direction than in FIG. 4.

Next, a specific example of the configuration of the main jig bodies will be described. This configuration will be described with reference to FIGS. 4 to 6 using the main jig bodies 3C to be attached as an example. The main jig bodies 3C are to be attached between the upper edges 107 (the regions on the top edge side of the sidewalls 101) and the edges of the doors 110. Note that the main jig bodies 3D and 3E have the configuration of the same purpose as the main jig bodies 3C and will therefore not be described in detail here.

Here, the configuration of the region near the upper edges 107 will be described briefly with reference to FIG. 8. The upper edges 107 and the top edges of the doors 110 are arranged with a gap GP. The bottom end of each upper edge 107 is curved inwards towards the vehicle interior side to form an opposite face 108 that faces a top edge face 111 of the respective door 110 in the vertical direction. Moreover, the edge of the opposite face 108 on the vehicle interior side is curved downwards to form a receiving face 109 that receives the door 110.

Figure 9:
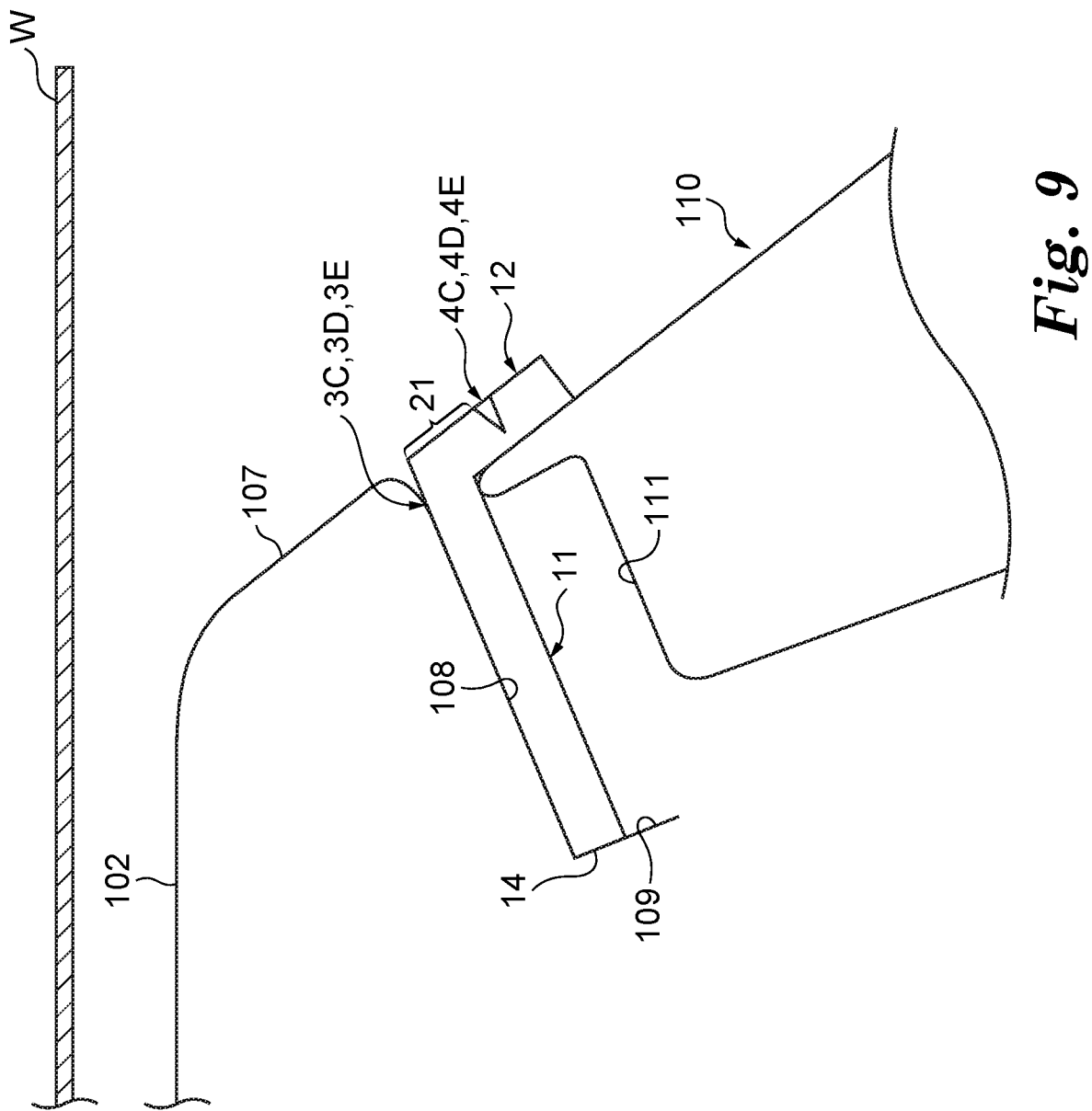
FIG. 9 is a schematic diagram for explaining the method of mounting the film.

Returning to FIGS. 4 to 6, each main jig body 3C includes an anchoring portion 11, an exposed portion 12, and an attachment portion 13. The anchoring portion 11 is inserted into the gap GP and can be anchored to one of the roof 102, the sidewall 101, and the door 110. Note that, in the present embodiment, the anchoring portion 11 is anchored to the opposite face 108 of the sidewall 101. The anchoring unit of the anchoring portion 11 will be described later. The anchoring portion 11 is a plate-shaped member that may extend towards the vehicle interior side. As illustrated in FIG. 9, when inserted into the gap GP, the anchoring portion 11 is arranged to face the opposite face 108 of the sidewall 101 and the top edge face 111 of the door 110. A positioning member 14 that contacts the receiving face 109 and thereby positions the main jig body 3C is formed in the back side of the anchoring portion 11. A spacing portion 16 that is separated from the receiving face 109 is formed in the positioning member 14. The back side edge of the spacing portion 16 is arranged further towards the vehicle exterior side than the positioning member 14, and therefore the spacing portion 16 remains separated from the receiving face 109 when the positioning member 14 is contacting the receiving face 109. Note that, the positioning member 14 is formed on each end of the anchoring portion 11 in the front-back direction, but the position in the front-back direction at which the positioning member 14 is formed is not particularly limited.

The exposed portion 12 is formed on the edge face of the anchoring portion 11 on the vehicle exterior side and extends out of or is otherwise exposed from the gap GP. When the main jig body 3C is attached to the vehicle, this exposed portion 12 extends along the upper edge 107 and the top edge of the door 110 in the front-back direction of the vehicle. A guide 4C is formed in the exposed portion 12. The guide 4C extends along the exposed portion 12 (that is, along the upper edge 107 and the top edge of the door 110) in the front-back direction of the vehicle. The top edge and the guide 4C of the exposed portion 12 are separated from one another. In other words, the exposed portion 12 includes, in the region between the upper edge 107 and the guide 4C, a peeling facilitation section 21, from the peeling facilitation section 21, the adhesive on the rear surface side of the film W being peeled more easily than from the sidewall 101. When the film W is cut along the guide 4C, the adhesive of the film W contacts the exposed portion 12. However, because the peeling facilitation section 21 is formed in the region between the upper edge 107 of the sidewall 101 and the guide 4C, the film W can be easily peeled off after being cut. Note that, the method for forming the peeling facilitation section 21 is not particularly limited. A surface treatment may be applied directly to the appropriate locations to make the film W easy to peel off, or a highly peelable material of the film W may be applied to the appropriate locations.

Note that, at an angled portion 28 formed in the guide 4C at an intersection between a cutting direction of the guide 4C of the main jig body 3C, a cutting direction of a guide 4B of the main jig body 3B, an extension 29 is formed to extend past the angled portion 28 towards the vehicle rear side end of the main jig body 3C along the cutting direction of the guide 4C of the main jig body 3C. An extension 31 is also formed at the angled portion 28. The extension 31 extends past the angled portion 28 towards the edge of the main jig body 3C (that is, towards the edge of the exposed portion 12 on the door 110 side) along the cutting direction of the guide 4B of the main jig body 3B.

The attachment portion 13 is used to attach the main jig body 3B that is to be arranged on the rear pillar 103. When the main jig body 3C is inserted into the gap GP, the attachment portion 13 is arranged on the outer surface of the rear pillar 103. In the attachment portion 13, protrusions 13a are formed to extend towards the vehicle exterior side. The protrusions 13a of the attachment portion 13 are inserted into holes in the main jig body 3C.

Figure 6:
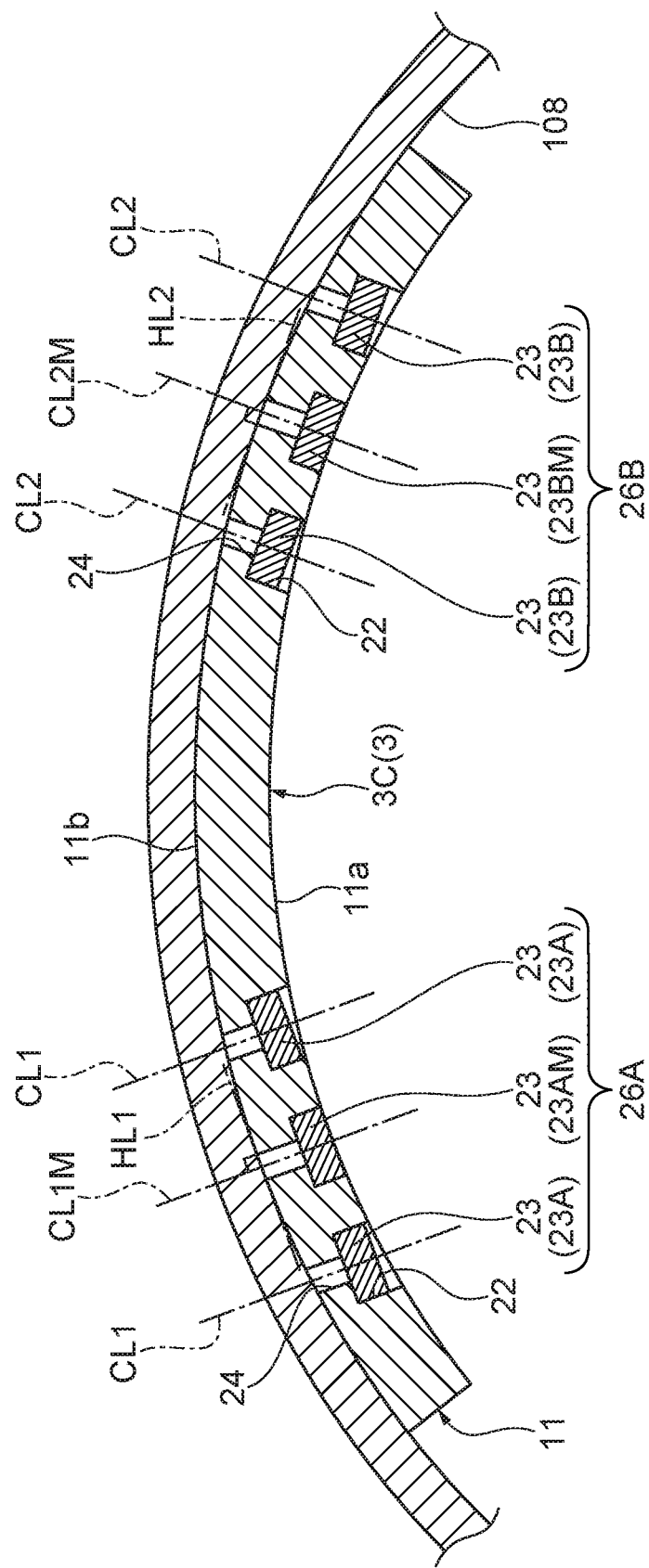
FIG. 6 is a cross-sectional view schematically illustrating an anchoring unit of the main jig body.

Next, the configuration of the anchoring portion 11 will be described in more detail with reference to FIG. 6. As illustrated in FIG. 8, the sidewall 101 includes the opposite face 108, which faces the top edge face 111 of the door 110 inside the gap GP. The opposite face 108 is curved in an upward-bulging manner. The anchoring portion 11 is curved along the opposite face 108 of the sidewall 101. The anchoring portion 11 also includes a plurality of magnets 23 as an anchoring unit. A plurality of grooves 22 are formed in a bottom surface 11a of the anchoring portion 11, and the magnets 23 are inserted into these grooves 22. Moreover, a plurality of through holes 24 are formed penetrating from the bottoms of the grooves 22 through towards a top surface 11b of the anchoring portion 11.

This anchoring portion 11 includes a first anchoring region 26A in which a plurality of first magnets 23A are arranged side by side along the surface direction of the opposite face 108 and a second anchoring region 26B in which a plurality of second magnets 23B are arranged side by side along the surface direction of the opposite face 108.

The first anchoring region 26A is arranged on one side of the anchoring portion 11 in the front-back direction of the vehicle, and the second anchoring region 26B is arranged on the other side of the anchoring portion 11 in the front-back direction of the vehicle. An axis of a magnet 23AM of the plurality of first magnets 23A is designated as a first main axis CL1M and is orthogonal to the opposite face 108. The axes of the other magnets 23A of the plurality of first magnets 23A are arranged parallel to the first main axis CL1M. An axis of a magnet 23BM of the plurality of second magnets 23B is designated as a second main axis CL2M and is orthogonal to the opposite face 108. The axes CL2 of the other magnets 23B of the plurality of second magnets 23B are arranged parallel to the second main axis CL2M. Note that, in the example illustrated in FIG. 6, the anchoring portion 11 includes two anchoring regions. However, the anchoring portion 11 may include three or more anchoring regions. Note that in the present specification, the phrase "the axis is orthogonal to the opposite face" means that the axis is orthogonal to a line tangent to the opposite face at the point of intersection between the axis and the opposite face (and that the axis is orthogonal to a plane formed by a set of such tangent lines).

Note that, of the main jig bodies illustrated in FIG. 2, the main jig bodies 3D and 3E that are to be attached to the upper edges 107 each include an anchoring portion and an exposed portion and have a guide 4D or 4E formed in the exposed portion, similar to the main jig body 3C. However, the main jig bodies 3D do not include an attachment portion. Moreover, the anchoring portion of each main jig body 3D is curved to avoid contact with the respective center pillar 104. The main jig bodies 3E each include an attachment portion for attaching the main jig bodies 3F that are arranged on the front pillars 106.

Figure 7:
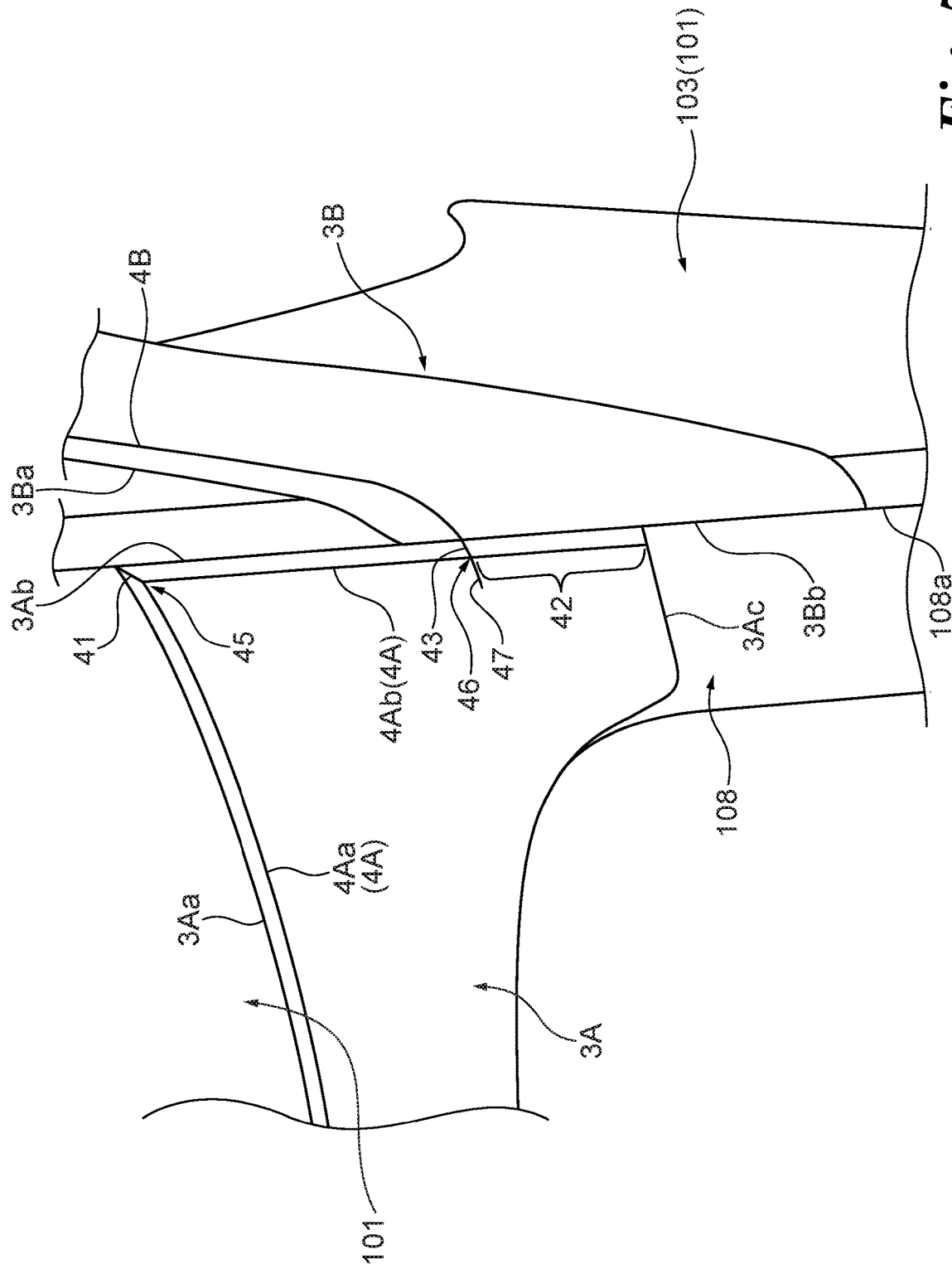
FIG. 7 is a plan view schematically illustrating a structure near a main jig body that is to be attached to a rear pillar.

As illustrated in FIGS. 2, 3, and 7, the main jig body 3A that is to be attached along the rear edge of the roof 102 has a plate-shaped shape that corresponds to the shape of the area near the top edge of the frame 118 of the rear window. As illustrated in FIG. 7, the main jig body 3A includes an edge 3Aa that has a shape corresponding to the rear edge of the roof 102 and extends in the vehicle width direction along that rear edge, as well as edges 3Ab that have a shape corresponding to boundaries 108a between the rear pillars 103 and the frame 118 and extend along those boundaries 108a. The main jig bodies 3B that are to be attached to the rear pillars 103 have a plate-shaped shape that corresponds to the shape of the outer surface of the rear pillars 103. As illustrated in FIG. 7, each of the main jig bodies 3B includes an edge 3Ba that extends in the front-back direction of the vehicle at a position at a prescribed height on the respective rear pillar 103 (that is, at a position that is continuous with at least the main jig body 3A and the main jig body 3C), as well as an edge 3Bb that has a shape corresponding to the respective boundary 108a and extends along that boundary 108a. The main jig bodies 3A and 3B each include a plurality of magnets as an anchoring unit. Similar to in the main jig body 3C, the magnets of the main jig bodies 3A and 3B are housed within grooves, and through holes that penetrate through towards an attachment surface on the vehicle are formed at the bottoms of the grooves.

In each main jig body 3B, the guide 4B is formed along the edge 3Ba in the front-back direction of the vehicle. The guide 4B intersects with the guide 4C at a position corresponding to the angled portion 28 and the extension 31 of the main jig body 3C illustrated in FIG. 4. The guide 4B also intersects with the edge 3Ab of the main jig body 3A. In the main jig body 3A, a guide 4Aa is formed along the edge 3Aa, and guides 4Ab are formed along the edges 3Ab. An extension 43 that is continuous with the guide 4B of the main jig body 3B is formed between the edge 3Ab and the guide 4Ab. Furthermore, at a corner 45 at an intersection between a cutting direction of the guide 4Aa and a cutting direction of the guide 4Ab of a guide 4A, an extension 41 is formed to extend past the corner 45 towards the edges 3Aa and 3Ab of the main jig body 3A along the cutting direction of the guide 4Aa and the cutting direction of the guide 4Ab. The extension 41 is a single groove that slants towards a corner between the edge 3Aa and the edge 3Ab to include components of the directions of both of the guides 4Aa and 4Ab. However, alternatively the guide 4Aa may be extended to form an edge going towards the edge 3Ab and the guide 4Ab may be extended to form an edge going towards the edge 3Aa. Furthermore, at a corner 46 at an intersection between the cutting direction of the guide 4Ab and the cutting direction of the guide 4B of the main jig body 3B (that is, the extension 43), an extension 42 is formed to extend past the corner 46 towards a bottom edge 3Ac of the main jig body 3A along the cutting direction of the guide 4Ab. An extension 47 is also formed at the corner 46. The extension 47 extends past the corner 46 towards the vehicle interior side of the main jig body 3A along the cutting direction of the guide 4B. Note that here, peeling facilitation sections may also be formed in the main jig bodies 3A and 3B in the regions between the guides 4A and 4B and the respective edges.

Note that, the main jig bodies 3F that are to be attached to the front pillars 106 and the main jig body 3G that is to be attached to the front frame 119 have the configuration of the same purpose as the main jig bodies 3B and 3A, respectively, and therefore a description of the main jig bodies 3F and 3G will be omitted here.

Next, a method of mounting a film according to the present embodiment will be described. This method of mounting a film is a method of mounting the film covering at least a roof of an object that includes sidewalls and the roof. The method of mounting the film includes a step of attaching the jig, a step of disposing the film, a step of cutting the film, and a step of adjusting the film.

In the step of attaching the jig, the film cutting jig 2 is attached to the vehicle 100 to continuously surround the covered region CP including the roof and the top edge sides of the sidewalls 101 when the vehicle 100 is viewed from above. More specifically, the main jig body 3A is attached to the rear frame 118; the main jig bodies 3B are attached to the rear pillars 103; the main jig bodies 3C, 3D, and 3E are inserted into the gap between the doors 110 and the upper edges 107 of the sidewalls 101; the main jig bodies 3F are attached to the front pillars 106: and the main jig body 3G is attached to the front frame 119. Here, the main jig bodies that are adjacent to one another are attached together continuously without any gaps therebetween. Moreover, the guides 4A to 4G formed in the main jig bodies 3A to 3G are disposed in continuous with one another.

Figure 8:
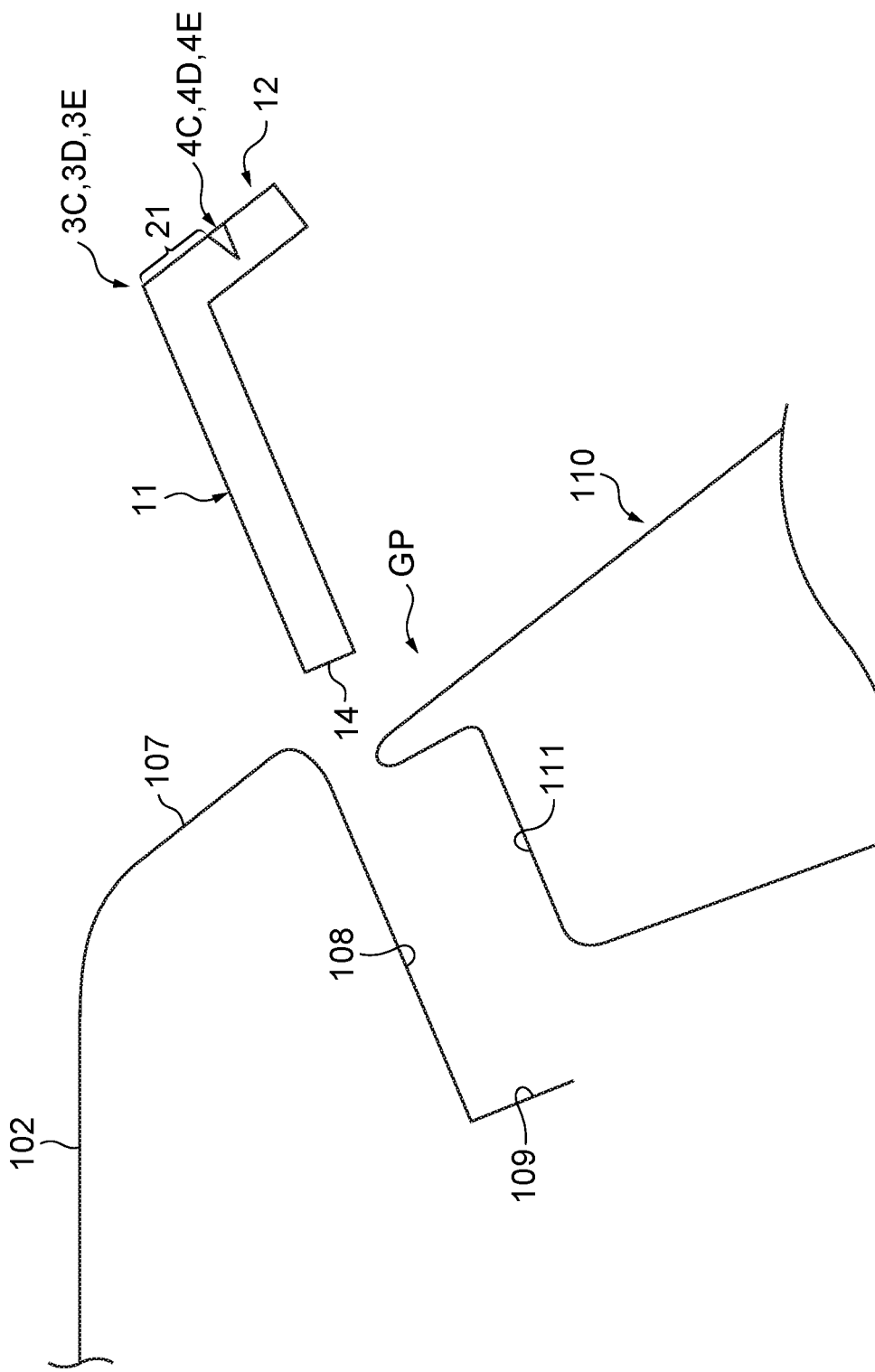
FIG. 8 is a schematic diagram for explaining a method of mounting a film.
Figure 13:
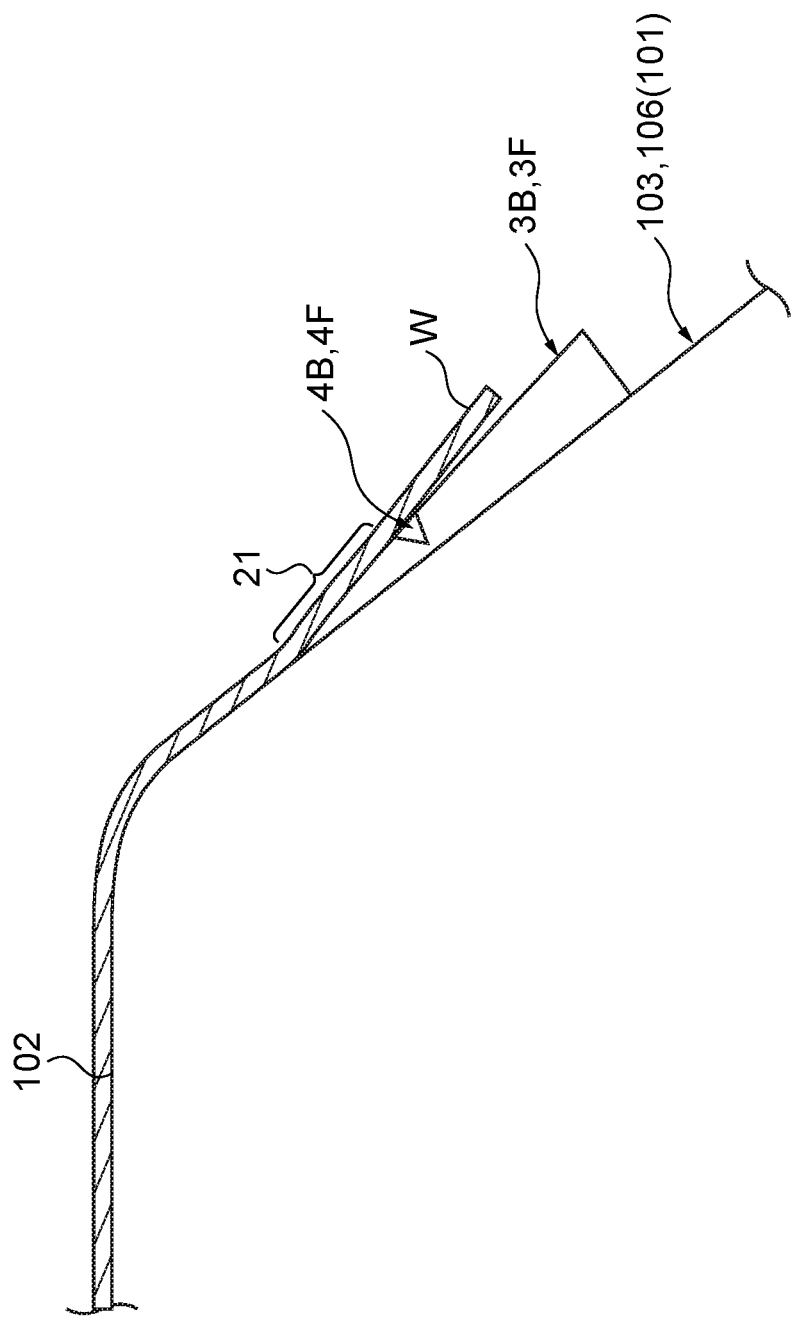
FIG. 13 is a schematic diagram for explaining the method of mounting the film.

As illustrated in FIGS. 8 and 9, for example, in this step, each of the main jig bodies 3C, 3D, and 3E are aligned with the gap GP between the upper edges 107 and the doors 110 and then inserted into the gap GP such that the anchoring portion 11 is anchored to the opposite face 108. Moreover, the positioning member 14 of the anchoring portion 11 contacts the receiving face 109 to position the main jig body 3C in the width direction thereof. Furthermore, as illustrated in FIG. 13, the main jig bodies 3B and 3F are anchored to the outer surfaces of the rear pillars 103 and the front pillars 106, respectively. Similarly, the main jig bodies 3A and 3G are anchored to the outer surfaces of the rear frame 118 and the front frame 119, respectively.

Figure 10:
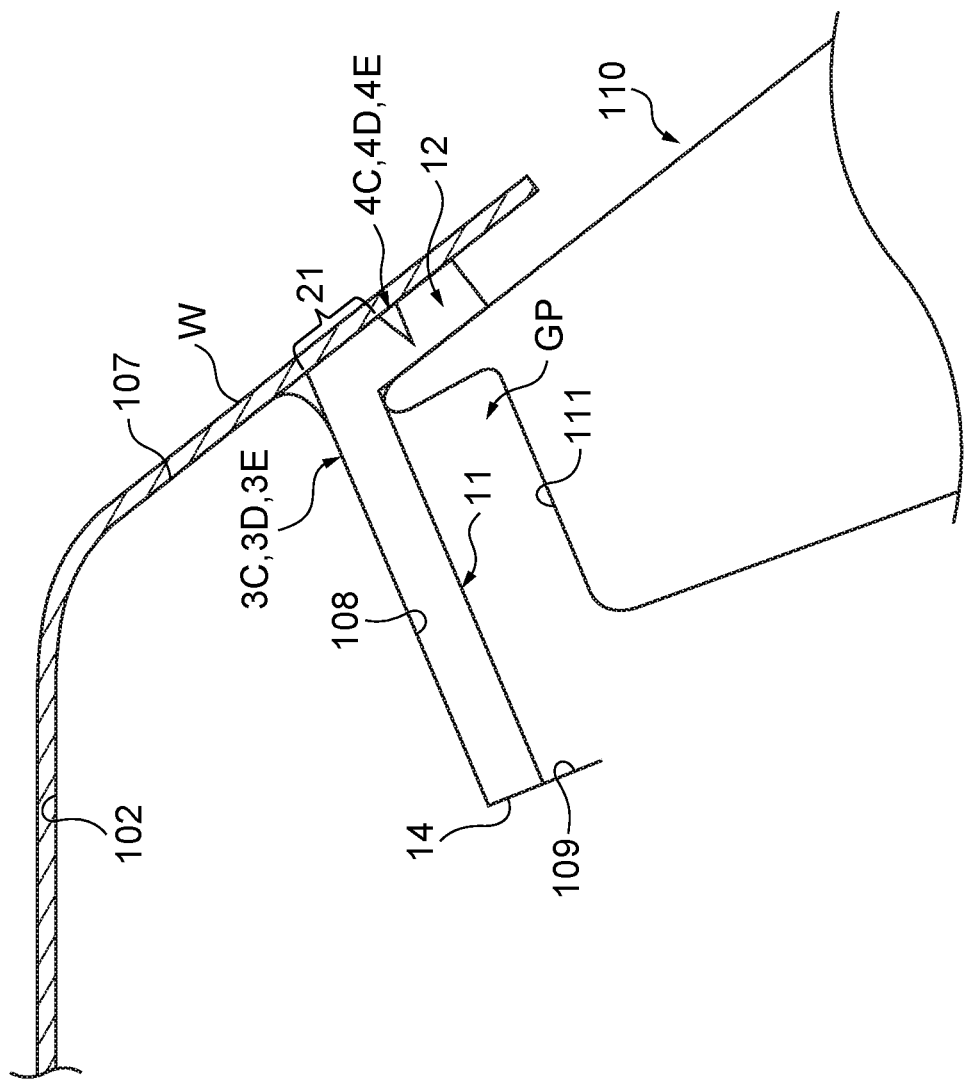
FIG. 10 is a schematic diagram for explaining the method of mounting the film.
Figure 12:
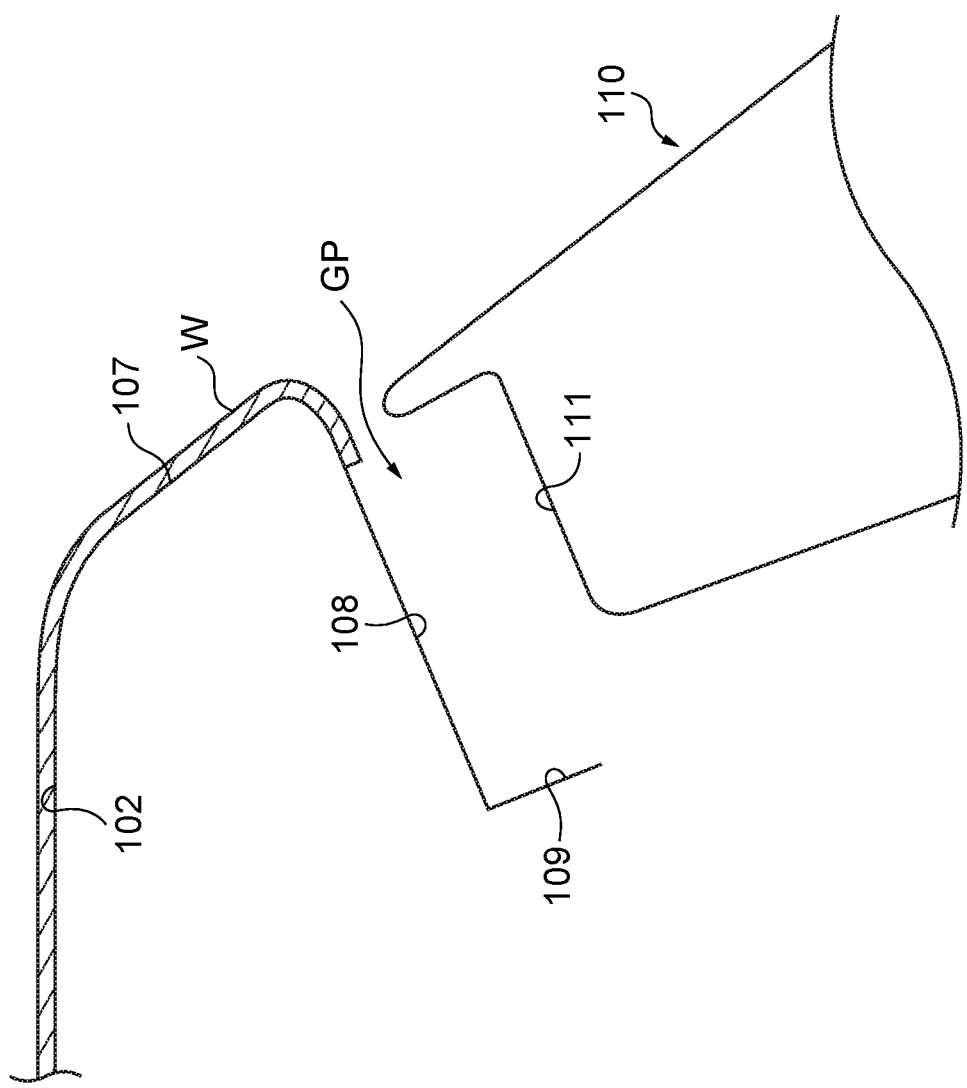
FIG. 12 is a schematic diagram for explaining the method of mounting the film.

Next, the step of disposing the film, with the film cutting jig 2 attached to the vehicle 100, is a step of disposing and applying the film W to the roof 102, the sidewalls 101, and the film cutting jig 2. As illustrated in FIG. 9, in this step, the film W is arranged above the roof 102 with the adhesive on the rear surface of the film W exposed, and then the film W is lowered downwards. In this way, as illustrated in FIG. 10, the film W is applied to the roof 102, the upper edges 107 of the sidewalls 101, and the exposed portions 12 of the main jig bodies 3C, 3D, and 3E. Moreover, as illustrated in FIG. 13, the film W is applied to the roof 102, the outer surfaces of the rear pillars 103, the outer surfaces of the front pillars 106, and the main jig bodies 3B and 3F. Furthermore, the film W in applied to the roof 102 as well as the main jig bodies 3A and 3G.

Next, the step of cutting the film is a step of guiding a cutting tool continuously (that is, continuously when the vehicle 100 is viewed from above) to surround the covered region CP along the guide 4 formed in the film cutting jig 2 in order to cut the film. Cutting the film W along the guide 4 in this way can cut the film W to a desired shape corresponding to the covered region CP and then remove any portions of the film W that do not need to be applied.

Figure 14:
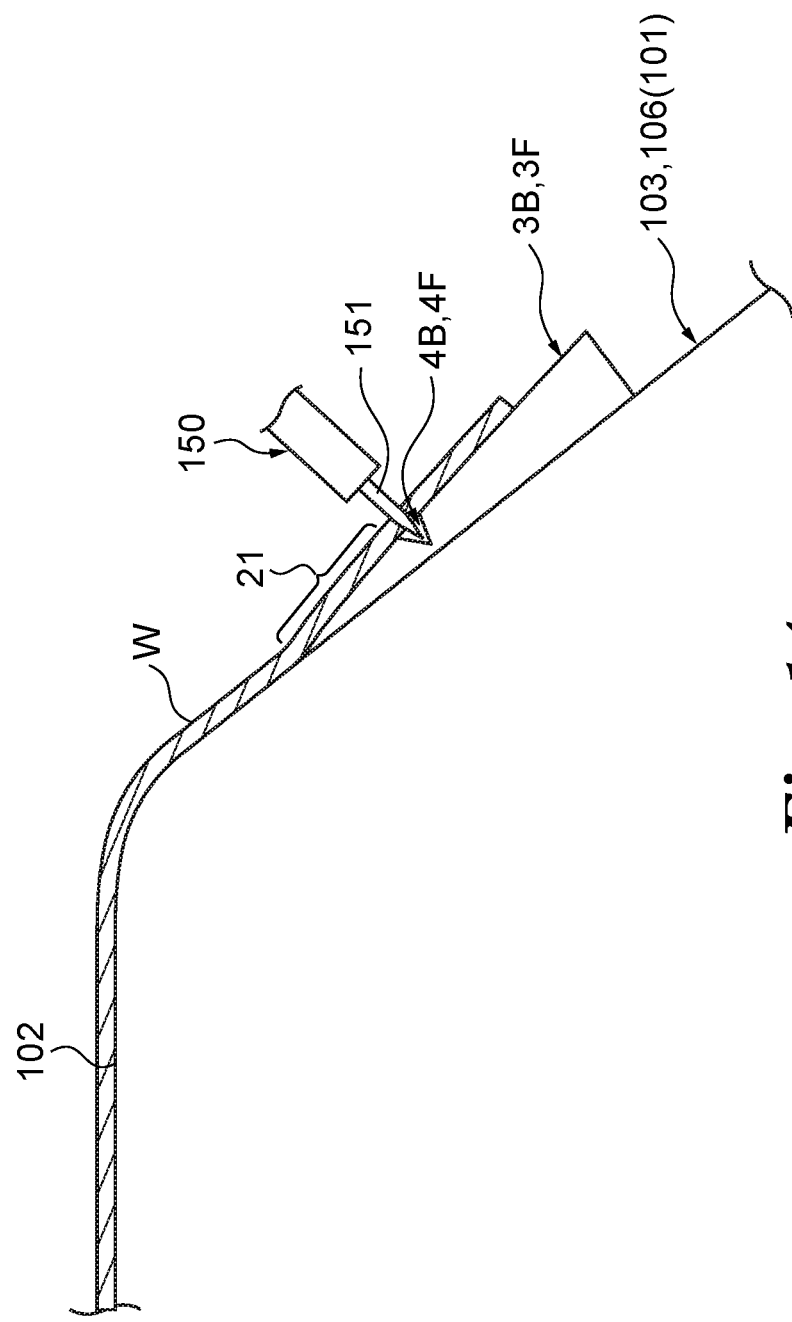
FIG. 14 is a schematic diagram for explaining the method of mounting the film.

As illustrated in FIGS. 11A and 14, in this step, a cutting tool 150 is guided along the guides 4B to 4F of the main jig bodies 3B to 3F to cut the film W. The cutting tool 150 is then guided along the guides 4A and 4G of the main jig bodies 3A and 3G to cut the film W. Here, as illustrated in FIGS. 11A and 11B, the cutting tool 150 that is used in the step of cutting the film includes a cutting edge 151 and a rod-shaped member 152 that extends towards the tip side of the cutting edge 151. The rod-shaped member 152 extends along the rear side of the cutting edge 151 along the extension direction of the cutting edge 151. As illustrated in FIG. 11C, the dimension of the rod-shaped member 152 in the width direction thereof is greater than the thickness of the cutting edge 151. Therefore, the rod-shaped member 152 protrudes out from both sides of the cutting edge 151 in the thickness direction thereof. As a result, when the cutting tool 150 is inserted into the guide 4, the rod-shaped member 152 contacts the groove surfaces of the guide 4, thus the film W can be cut while keeping the cutting edge 151 separated from the groove surfaces of the guide 4.

Figure 15:
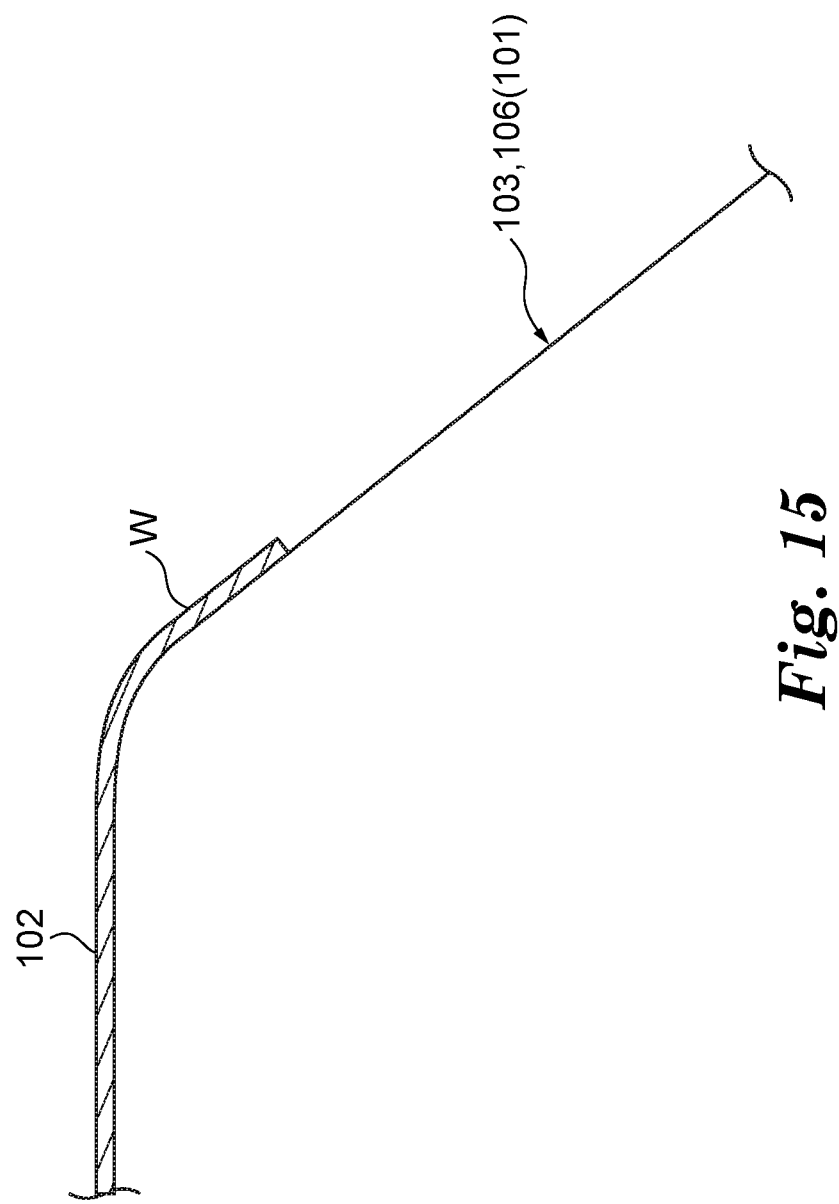
FIG. 15 is a schematic diagram for explaining the method of mounting the film.

Next, the step of adjusting the film is a step of, after the film W is cut, removing the main jig bodies 3A to 3G, and re-applying the portions of the film W that were applied to the main jig bodies 3A to 3G to the vehicle 100. The portions of the film W that were peeled off of the peeling facilitation sections 21 of the main jig bodies 3C, 3D, and 3E are folded around the bottom ends of the upper edges 107 and applied to the opposite faces 108. Moreover, as illustrated in FIG. 15, the portions of the film W that were peeled off of the peeling facilitation sections 21 of the main jig bodies 3B and 3F are applied to the outer surfaces of the rear pillars 103 and the outer surfaces of the front pillars 106. Furthermore, the portions of the film W that were peeled off of the peeling facilitation sections 21 of the main jig bodies 3A and 3G are folded around and applied to level differences at the boundaries between the frames 118 and 119 and the roof 102. This completes mounting of the film W.

Next, the functions and effects of the film cutting jig 2 and the method of mounting the film according to the present embodiment will be described.

The film cutting jig 2 according to the present embodiment includes a main jig body 3 that is to be attached to the vehicle 100 to continuously surround the covered region CP including the roof 102 and the top edge sides of the sidewalls 101. Moreover, the guide 4 guiding the cutting tool 150 to cut the film W is formed in the main jig body 3, and the guide 4 is formed to continuously surround the covered region CP when the vehicle 100 is viewed from above. As a result, during operation, attaching the main jig body 3 to the vehicle 100 and then cutting the film W along the guide 4 formed in the main jig body 3 can easily cut the film W into a shape that corresponds to the covered region CP. In this way, the film W that not only covers the roof 102 but also wraps around to the sidewalls 101 can be easily mounted.

The vehicle 100 on which the film cutting jig 2 is used includes the sidewalls 101 and the doors 110, and the upper edges 107 (that is, the top edge side regions) of the sidewalls 101 and the edges of the doors 110 are arranged with the gap GP. The main jig bodies 3C, 3D, and 3E each include the anchoring portion 11 that can be inserted into the gap GP and anchored to the respective sidewall 101 as well as the exposed portion 12 that is formed in the edge face of the anchoring portion 11 and extends out of or is otherwise exposed from the gap GP. The guide 4 is formed in the exposed portion 12. According to this configuration, a worker can easily arrange the guide 4 between the upper edges 107 and the doors 110 simply by inserting the main jig bodies 3C, 3D, and 3E into the gaps GP and anchoring the anchoring portions 11 to the sidewalls 101.

The sidewalls 101 to which the film cutting jig 2 is to be attached include the pillars 103 and 106 on at least one side in the horizontal direction of the doors 110. Therefore, the film W is applied to the pillars 103 and 106 of the sidewalls 101.

In the film cutting jig 2, the top edge and the guide 4 of the exposed portion 12 are separated from one another. According to this configuration, a folding portion of the film W between the position at which the film W is cut and the upper end of the gap GP (that is, the bottom end of the upper edge 107 of each sidewall 101) can be maintained. Folding this folding portion towards the opposite face 108 side can arrange the cut edge of the film W inside the gap GP.

In the film cutting jig 2, the exposed portion 12 includes, in the region thereof between the top edge and the guide 4, the peeling facilitation section 21, from the peeling facilitation section 21, the adhesive on the rear surface side of the film W being peeled more easily than from the sidewalls 101. According to this configuration, the film W can be easily peeled off of the main jig bodies 3C, 3D, and 3E after the film W is cut.

The sidewalls 101 to which the film cutting jig 2 is to be attached each include the opposite face 108 that faces the top edge face 111 of the doors 110 inside the gap GP and that is curved in an upward-bulging manner. The opposite face 108 is curved in an upward-bulging manner. Each anchoring portion 1 is curved along the opposite face 108 of the sidewall 101 and includes the first anchoring region 26A in which the plurality of first magnets 23A are arranged side by side along the surface direction of the opposite face 108 as well as the second anchoring region 26B in which the plurality of second magnets 23B are arranged side by side along the surface direction of the opposite face 108. The axis of the magnet 23AM of the plurality of first magnets 23A is designated as the first main axis CL1M and is orthogonal to the opposite face 108. The axes CL1 of the other magnets 23A of the plurality of first magnets 23A are arranged parallel to the first main axis CLM. The axis of the magnet 23BM of the plurality of second magnets 23B is designated as the second main axis CL2M and is orthogonal to the opposite face 108. The axes CL2 of the other magnets 23B of the plurality of second magnets 23B are arranged parallel to the second main axis CL2M. According to this configuration, a sufficient anchoring force from the magnets can be achieved because the directions of the axes of the magnets are arranged corresponding to the curved opposite face 108 in at least the first anchoring region 26A and the second anchoring region 26B. In this way, the directions of the axes of the magnets are arranged to the curved opposite face 108, with the axes CL1 and CL2 of the magnets 23A and 23B other than the magnets 23AM and 23BM being arranged parallel to the representative main axes CL1M and CL2M. This can make the manufacturing process easier. In other words, making the axes of all of the magnets orthogonal to the opposite face 108, for example, would increase the difficulty of design and manufacturing.

In the sidewalls 101 to which the film cutting jig 2 is attached, the receiving face 109 that receives the doors 110 is formed at the back side of the gaps GP. The positioning member 14 that contacts the receiving face 109 and thereby positions the main jig bodies 3C, 3D, and 3E is formed on the back side of each anchoring portion 11, and the spacing portion 16 that is separated from the receiving face 109 is formed in each positioning member 14. If the entire back side edge of each anchoring portion 11 were to contact the receiving face 109, for example, factors such as errors in the dimensions of each component could potentially cause unsteadiness between the anchoring portion 11 and the receiving face 109. Meanwhile, forming the spacing portion 16 ensures that the anchoring portion 11 only contacts the receiving face 109 partially at the positioning member 14, thus the possibility of unsteadiness can be reduced.

The main jig body 3 of the film cutting jig 2 is divided into a plurality of sections along the peripheral direction of the covered region CP. According to this configuration, the main jig body 3 can be more easily attached to the vehicle 100 during operation.

In the film cutting jig 2, at the corner 45 at the intersection between the cutting direction of the guide 4Aa and the cutting direction of the guide 4Ab of the guide 4A, the extension 41 is formed to extend past the corner 45 towards the edges 3Aa and 3Ab of the main jig body 3A along both cutting directions. Moreover, at the angled portion 28 at the intersection between the cutting direction of the guide 4C of the main jig body 3C and the cutting direction of the guide 4B of the main jig body 3B, the extension 29 is formed to extend past the angled portion 28 towards the vehicle rear side end of the main jig body 3C along the cutting direction of the guide 4C of the main jig body 3C. Furthermore, the extension 31 is formed to extend past the angled portion 28 towards the bottom edge side of the main jig body 3C along the cutting direction of the guide 4B of the main jig body 3B. With these extensions formed as described, a worker can smoothly move the cutting tool 150 even at the corners of the guide, thus the quality of the cut shape of the film at the corners can be improved.

The method of mounting the film for mounting the film W that covers at least the roof 102 of the vehicle 100 that includes the sidewalls 101 and roof 102 includes the step of attaching the jig in which the film cutting jig 2 is attached to the vehicle 100 to continuously surround the covered region CP that includes the roof 102 and at least a portion of the top edge sides of the sidewalls 101 when the vehicle 100 is viewed from above, as well as the step of cutting the film in which film W is cut by guiding the cutting tool 150 continuously (that is, continuously when the vehicle 100 is viewed from above) to surround the covered region CP along the guide 4 formed in the film cutting jig 2.

According to this embodiment, the same functions and effects as the film cutting jig 2 described above can be achieved.

In the method of mounting the film, the cutting tool 150 that is used in the step of cutting the film includes the cutting edge 151 and the rod-shaped member 152 that extends towards the tip side of the cutting edge 151. Forming this rod-shaped member 152 ensures that the rod-shaped member 152 contacts the guide 4, thus the cutting edge 151 can be prevented from contacting the guide 4 directly.

The present invention is not limited to the embodiment described above.

Figure 16:
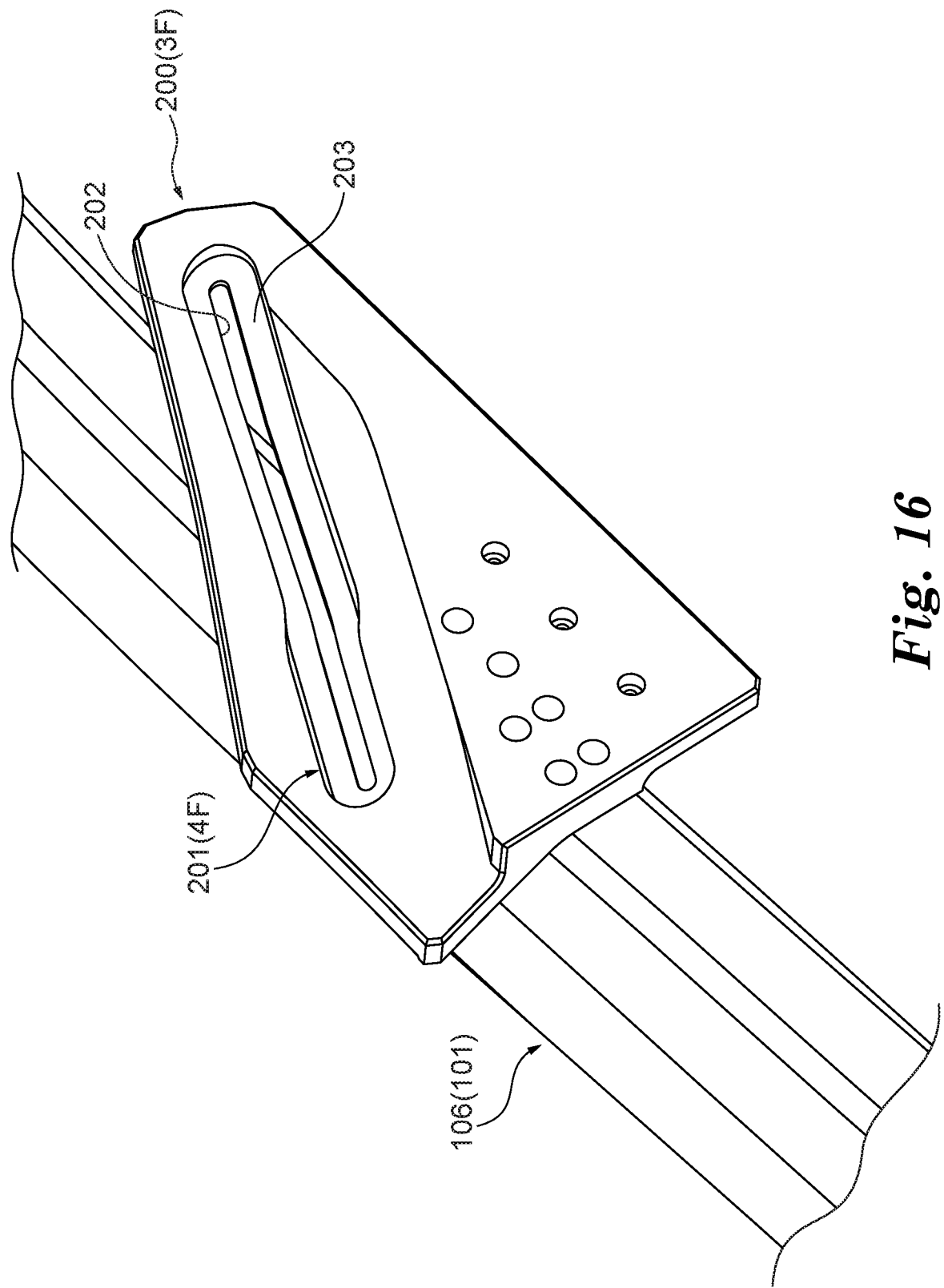
FIG. 16 is a perspective view of a cover.

For example, in the embodiment described above, the main jig bodies 3B and 3F are attached to the pillars 103 and 106, and the film W is temporarily applied to the main jig bodies 3B and 3F. The film W therefore needs to be peeled off of the main jig bodies 3B and 3F after being cut and then re-applied to the pillars 103 and 106. As a result, if a glossy film W is used, shock lines or the like may potentially remain in the surface of the film W. Therefore, as illustrated in FIG. 16, the film W may be applied to the pillars 103 and 106 in advance and then covered with a cover 200 before being cut.

In other words, here the film cutting jig includes covers 200, which are to be attached to each front pillar 106 to cover, from above, the film W that is applied to the front pillars 106 of the sidewall 101. A guide 201 of each cover 200 includes a through portion 202 that extends along the cutting direction and penetrates through the cover 200 as well as a groove 203 that is recessed inwards from the outer surface at the side edges of the through portion 202 and extends along the through portion 202. The cover 200 corresponds to the main jig body 3F, and the guide 201 corresponds to the guide 4F.

Figure 18:
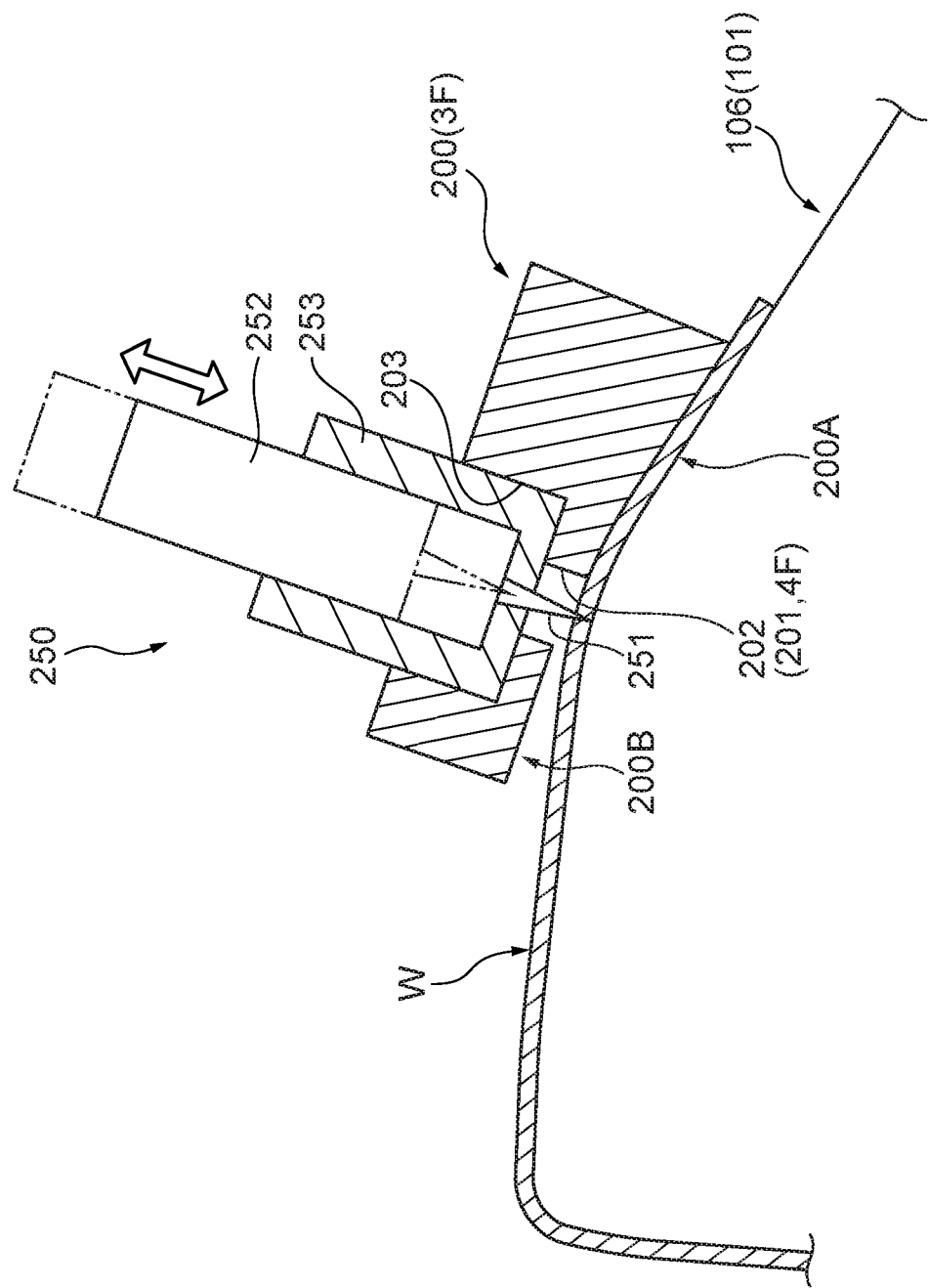
FIG. 18 is a cross-sectional view schematically illustrating the cover and a cutting tool used together with the cover when cutting.

As illustrated in FIG. 18, a dedicated cutting tool 250 may be used when using this cover 200. The cutting tool 250 includes a rod-shaped member 252 with a cutting edge 251 formed in the tip thereof and a housing 253 that houses the tip of the rod-shaped member 252 and the cutting edge 251 in a retractable manner. The housing 253 supports the rod-shaped member 252 using an elastic mechanism (not illustrated in the figure). When the cutting tool 250 is not being used, the cutting edge 251 is housed within the housing 253 (in the state indicated by the two-dot chain line in the figure). Meanwhile, when the cutting tool 250 is being used to cut, the housing 253 is arranged inside the groove 203 of the cover 200, and the rod-shaped member 252 is depressed to make the cutting edge 251 protrude out of the housing 253, and pass through the through portion 202 to reach the film W on the outer surface of the front pillar 106. In this state, the housing 253 is then moved along the groove 203, thus the film W can be cut at the desired position using the cutting tool 250. This also can prevent the cutting edge 251 from pressing harder than necessary into the film W, thus damage to the pillar surface can be prevented.

This cover 200 can cut the film W with the film W already applied to the front pillar 106. This removes the need to peel the film W off of the main jig body 3 after being cut, thus formation of shock lines in the film W can be prevented.

Figure 17:
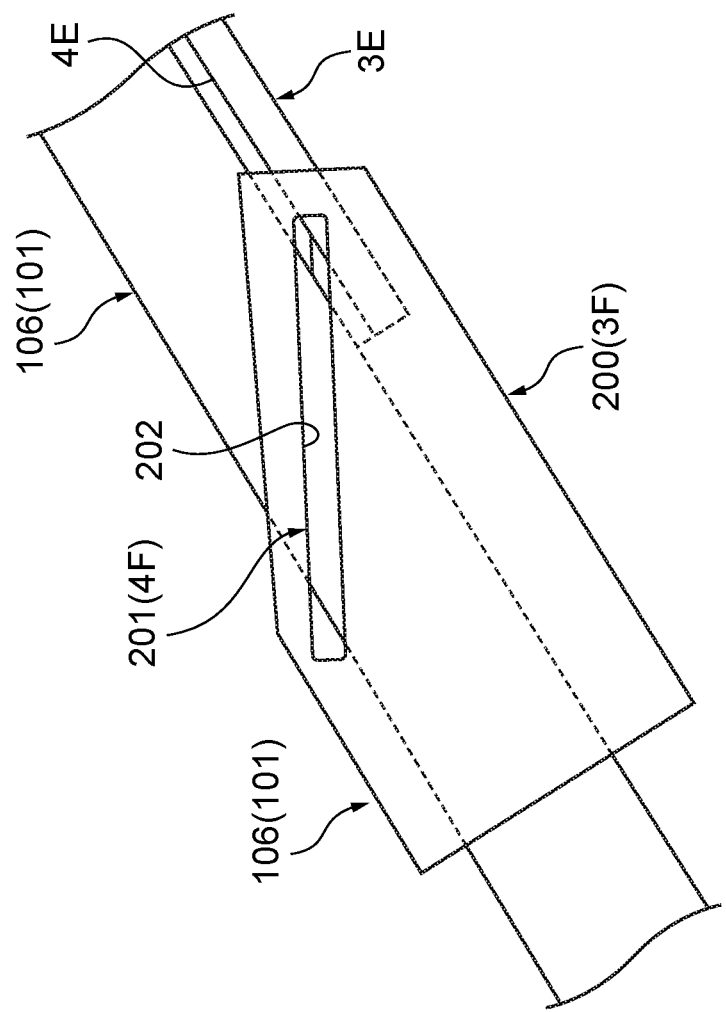
FIG. 17 schematically illustrates the cover as viewed from the vehicle width direction.

Note that, as illustrated in FIG. 17, the cover 200 is arranged such that the guide 4E of the main jig body 3E intersects with the guide 201. This can cut the film W along the guide 201 continuously with the cut made along the guide 4E when the film W was cut along the main jig body 3E.

Furthermore, the cover 200 can be attached to the outer surface of the front pillar 106 via a lower region 200A, which is arranged on a side opposite to the covered region CP relative to the through portion 202. An upper region 200B of the cover 200 is arranged on the covered region CP side relative to the through portion 202 and is separated from the front pillar 106. Separating the cover 200 from the front pillar 106 (that is, from the film W) on the side covering the covered region CP can prevent a mark from when the cover 200 was attached from being left in the film W after being cut. Meanwhile, attaching the cover 200 to the front pillar 106 via the lower region 200A can improve the anchoring properties of the cover 200 on the portion of the film W that will be removed after being cut. Note that, a cover with the configuration of the same purpose as the cover 200 may be attached to each rear pillar 103 as well.

Note that, in the embodiment described above, the object to which the film is applied was a vehicle as an example. However, the object to which the film is mounted is not limited to vehicles, and the film may be mounted to any object that has a roof and sidewalls. Examples of such objects include trains, aircraft, and the like.

In addition, in the embodiment described above, the anchoring portions of the main jig body 3 do not necessarily need to be anchored to the sidewalls and may instead be anchored to the roof or to the doors.

REFERENCE SIGNS LIST

2 Film cutting jig
3 Main jig body
4 Guide
11 Securing portion
12 Exposed portion
14 Positioning member
16 Spacing portion
21 Peeling facilitation section
23 Magnet
26A First anchoring region
26B Second anchoring region
41 Extension
45 Corner
100 Vehicle
101 Sidewall
102 Roof
107 Upper edge
108 Opposite face
109 Receiving face
110 Door
150 Cutting tool
151 Cutting edge
152 Rod-shaped member
200 Cover
201 Guide
202 Through portion
203 Groove
W Film
CP Covered region

The invention claimed is:

1. A film cutting jig configured for cutting an adhesive-backed paint replacement film so as to cover and be easily adhered to at least a roof and sidewall of a vehicle body, said film cutting jig comprising:
a main jig body that is to be attached to the vehicle body so as to continuously surround a covered region of the vehicle body that includes the roof and at least a portion of a top edge side of the sidewall, when the vehicle body is viewed from above,
wherein a guide for guiding a cutting tool including a cutting edge to cut the adhesive-backed paint replacement film is formed in the main jig body so as to continuously surround the covered region, when the vehicle body is viewed from above
wherein the main jig body is divided into a plurality of sections along a peripheral direction of the covered region, and further wherein the plurality of sections are attached to one another by at least one protrusion of a first section that is inserted into a second section.

2. The film cutting jig according to claim 1, wherein the sidewall of the vehicle body includes a door, a top edge of the door and a region on the top edge side of the sidewall are arranged with a gap, and said main jig body includes:
an anchoring portion that is inserted into the gap and is anchorable to at least one of the roof, the sidewall, and the door; and
an exposed portion formed in an edge face of said anchoring portion and exposed from the gap, and
wherein said guide is formed in said exposed portion.

3. The film cutting jig according to claim 2, wherein said guide and a top edge of said exposed portion are separated from one another.

4. The film cutting jig according to claim 3, wherein said exposed portion includes, in a region thereof between the top edge of said exposed portion and said guide, a peeling facilitation section, from said peeling facilitation section, an adhesive on a rear surface side of the film being more easily peelable than from the sidewall.

5. The film cutting jig according to claim 2,
wherein a receiving face that receives the door is formed, at a back side of the gap, in at least one of the roof and the sidewall,
wherein a positioning member that contacts the receiving face and positions the main jig body is formed in the back side of the anchoring portion, and
wherein a spacing portion that is separated from the receiving face is formed in the positioning member.

6. The film cutting jig according to claim 1, wherein at a corner of the guide at an intersection between a first cutting direction and a second cutting direction, an extension is formed to extend past the corner towards an edge side of the main jig body along the first cutting direction and the second cutting direction.

7. The film cutting jig according to claim 1, wherein the protrusions of the first section are inserted into holes in the second section.

8. The film cutting jig according to claim 1, wherein the guide is in the form of a channel having tapered surfaces for contacting a portion of the cutting tool while keeping the cutting edge separated from the guide.

9. The film cutting jig according to claim 1, wherein the guide comprises a cutting slit for receiving the cutting tool, and further wherein the guide further comprises a protective cutting tool aid inserted into the cutting slit such that it can be moved along the cutting slit in cutting direction, the cutting tool aid being dimensioned to receive at least a part of the cutting tool.

10. A film cutting jig comprising
a film cutting jig configured for cutting an adhesive-backed paint replacement film so as to cover and be easily adhered to at least a roof and sidewall of a vehicle body, said film cutting jig comprising:
a main jig body that is to be attached to the vehicle body so as to continuously surround a covered region of the vehicle body that includes the roof and at least a portion of a top edge side of the sidewall, when the vehicle body is viewed from above, wherein the sidewall of the vehicle body includes a door, a top edge of the door and a region on the top edge side of the sidewall are arranged with a gap, and said main jig body includes:
- an anchoring portion that is inserted into the gap and is anchorable to at least one of the roof, the sidewall, and the door; and
- an exposed portion formed in an edge face of said anchoring portion and exposed from the gap, wherein said guide is formed in said exposed portion;

wherein a guide for guiding a cutting tool to cut the adhesive-backed paint replacement film is formed in the main jig body so as to continuously surround the covered region, when the vehicle body is viewed from above;

wherein at least one of the roof and the sidewall includes an opposite face that faces a top edge face of the door inside the gap and is curved in an upward-bulging manner, and wherein the anchoring portion is curved along the opposite face of the sidewall and includes a first anchoring region provided with, a plurality of first magnets being arranged side by side along a surface direction of the opposite face therein, and a second anchoring region provided with a plurality of second magnets being arranged side by side along the surface direction of the opposite face therein, wherein an axis of one magnet of the plurality of first magnets is designated as a first main axis and is orthogonal to the opposite face, and axes of other magnets of the plurality of first magnets are arranged parallel to the first main axis, and wherein an axis of one magnet of the plurality of second magnets is designated as a second main axis and is orthogonal to the opposite face, and axes of other magnets of the plurality of second magnets are arranged parallel to the second main axis.

11. A film cutting jig configured for cutting an adhesive-backed paint replacement film so as to cover and be easily adhered to at least a roof and sidewall of a vehicle body, said film cutting jig comprising:
- a main jig body that is to be attached to the vehicle body so as to continuously surround a covered region of the vehicle body that includes the roof and at least a portion of a top edge side of the sidewall, when the vehicle body is viewed from above,
- wherein a guide for guiding a cutting tool to cut the adhesive-backed paint replacement film is formed in the main jig body so as to continuously surround the covered region, when the vehicle body is viewed from above,
- wherein the corner of the guide comprises two discrete channels intersecting each other along a first cutting direction and a second cutting direction, respectively, and further wherein one or both of the discrete channels extend past the intersection to facilitate smooth movement of the cutting tool at a corner of the intersection.

12. A method of mounting a film to cover at least a roof of an object that includes a sidewall and the roof, the method comprising:
- attaching to the object a film cutting jig to continuously surround a covered region including the roof and at least a portion of a top edge side of the sidewall when the object is viewed from above, wherein the film cutting jig is divided into a plurality of sections along a peripheral direction of the covered region;
- attaching the plurality of sections to one another by inserting at least one protrusion of a first section into a second section;
- applying the film to the object and an exposed portion of the film cutting jig;
- cutting the film by guiding a cutting tool continuously, when the object is viewed from above, to surround the covered region along a guide formed in the film cutting jig, the cutting tool including a cutting edge;
- removing the film cutting jig from the object; and
- re-applying at least some portions of the film previously applied to the film cutting jig to the object.

13. The method of mounting the film according to claim 12, wherein the cutting tool used in cutting the film includes a cutting edge and a rod-shaped member that extends towards a tip side of the cutting edge.

14. The method of mounting the film according to claim 12, wherein the protrusions of the first section are inserted into holes in the second section.

15. The method of mounting the film according to claim 12, wherein the guide is in the form of a channel having tapered surfaces for contacting a portion of the cutting tool while keeping the cutting edge separated from the guide.

16. The method of mounting the film according to claim 12, wherein the guide comprises a cutting slit for receiving the cutting tool, and further comprising:
- providing a protective cutting tool aid within the cutting slit such that it can be moved along the cutting slit in cutting direction, the cutting tool aid dimensioned to receive at least a part of the cutting tool; and
- inserting the blade of the cutting tool into the protective aid prior to cutting the film.

* * * * *